(12) United States Patent
Pietrzyk et al.

(10) Patent No.: US 9,988,949 B2
(45) Date of Patent: Jun. 5, 2018

(54) METHOD AND SYSTEM FOR VARIABLE CAM TIMING DEVICE

(71) Applicant: Ford Global Technologies, LLC, Dearborn, MI (US)

(72) Inventors: Paul A. Pietrzyk, Beverly Hills, MI (US); John Eric Rollinger, Sterling Heights, MI (US); Jamie Charles Hanshaw, South Lyon, MI (US); Ed Badillo, Flat Rock, MI (US); Gilbert Fournelle, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 824 days.

(21) Appl. No.: 14/520,174

(22) Filed: Oct. 21, 2014

(65) Prior Publication Data

US 2016/0108772 A1    Apr. 21, 2016

(51) Int. Cl.
| | |
|---|---|
| F01L 1/00 | (2006.01) |
| F01L 1/34 | (2006.01) |
| F01L 1/344 | (2006.01) |
| F02D 41/14 | (2006.01) |
| F01L 1/047 | (2006.01) |
| F02D 41/22 | (2006.01) |

(52) U.S. Cl.
CPC .......... *F01L 1/34409* (2013.01); *F01L 1/047* (2013.01); *F02D 41/1497* (2013.01); *F02D 41/222* (2013.01)

(58) Field of Classification Search
CPC ..... F01L 1/34409; F01L 1/3442; F01L 1/344; F01L 2001/3443; F01L 2001/34453; F01L 2001/34426

USPC .............................................. 123/90.17, 90.1
See application file for complete search history.

(56) References Cited

U.S. PATENT DOCUMENTS

| | | | |
|---|---|---|---|
| 6,330,869 B1 | 12/2001 | Yoshiki et al. | |
| 7,841,310 B2 * | 11/2010 | Child | F01L 1/3442 123/90.12 |
| 8,127,725 B2 | 3/2012 | Crowe et al. | |
| 8,356,583 B2 * | 1/2013 | Smith | F01L 1/3442 123/90.15 |
| 8,714,123 B2 | 5/2014 | Rollinger et al. | |
| 8,733,304 B2 | 5/2014 | Crowe et al. | |
| 2005/0034695 A1 * | 2/2005 | Smith | F01L 1/022 123/90.17 |
| 2011/0048346 A1 | 3/2011 | Crowe et al. | |
| 2013/0192557 A1 | 8/2013 | Rollinger et al. | |

OTHER PUBLICATIONS

Crowe, J., "Hydraulic Circuit for Valve Deactivation," U.S. Appl. No. 14/665,448, filed Mar. 23, 2015, 54 pages.

(Continued)

*Primary Examiner* — Laert Dounis
*Assistant Examiner* — Kelsey Stanek
(74) *Attorney, Agent, or Firm* — Julia Voutyras; McCoy Russell LLP

(57) ABSTRACT

Methods and systems are described for an engine with a cam torque actuated variable cam timing phaser. Phaser positioning control is improved by reducing inaccuracies resulting from inadvertent spool valve and/or phaser movement when the spool valve is commanded between regions. In addition, improved spool valve mapping is used to render phaser commands more consistent and robust.

19 Claims, 18 Drawing Sheets

(56) References Cited

OTHER PUBLICATIONS

Rollinger, John E. et al., "Method and System for Variable Cam Timing Device," U.S. Appl. No. 14/520,173, filed Oct. 21, 2014, 98 pages.
Pietrzyk, Paul A. et al., "Method and System for Variable Cam Timing Device," U.S. Appl. No. 14/520,184, filed Oct. 21, 2014, 97 pages.
Pietrzyk, Paul A. et al., "Method and System for Variable Cam Timing Device," U.S. Appl. No. 14/520,187, filed Oct. 21, 2014, 100 pages.
Pietrzyk, Paul A. et al., "Method and System for Variable Cam Timing Device," U.S. Appl. No. 14/520,192, filed Oct. 21, 2014, 98 pages.
Rollinger, John E. et al., "Method and System for Variable Cam Timing Device," U.S. Appl. No. 14/520,194, filed Oct. 21, 2014, 98 pages.
Pietrzyk, Paul A. et al., "Method and System for Variable Cam Timing Device," U.S. Appl. No. 14/520,199, filed Oct. 21, 2014, 98 pages.
Ossareh, Hamid-Reza et al., "System and Methods for CBV Diagnostics," U.S. Appl. No. 14/537,216, filed Nov. 10, 2014, 29 pages.

\* cited by examiner

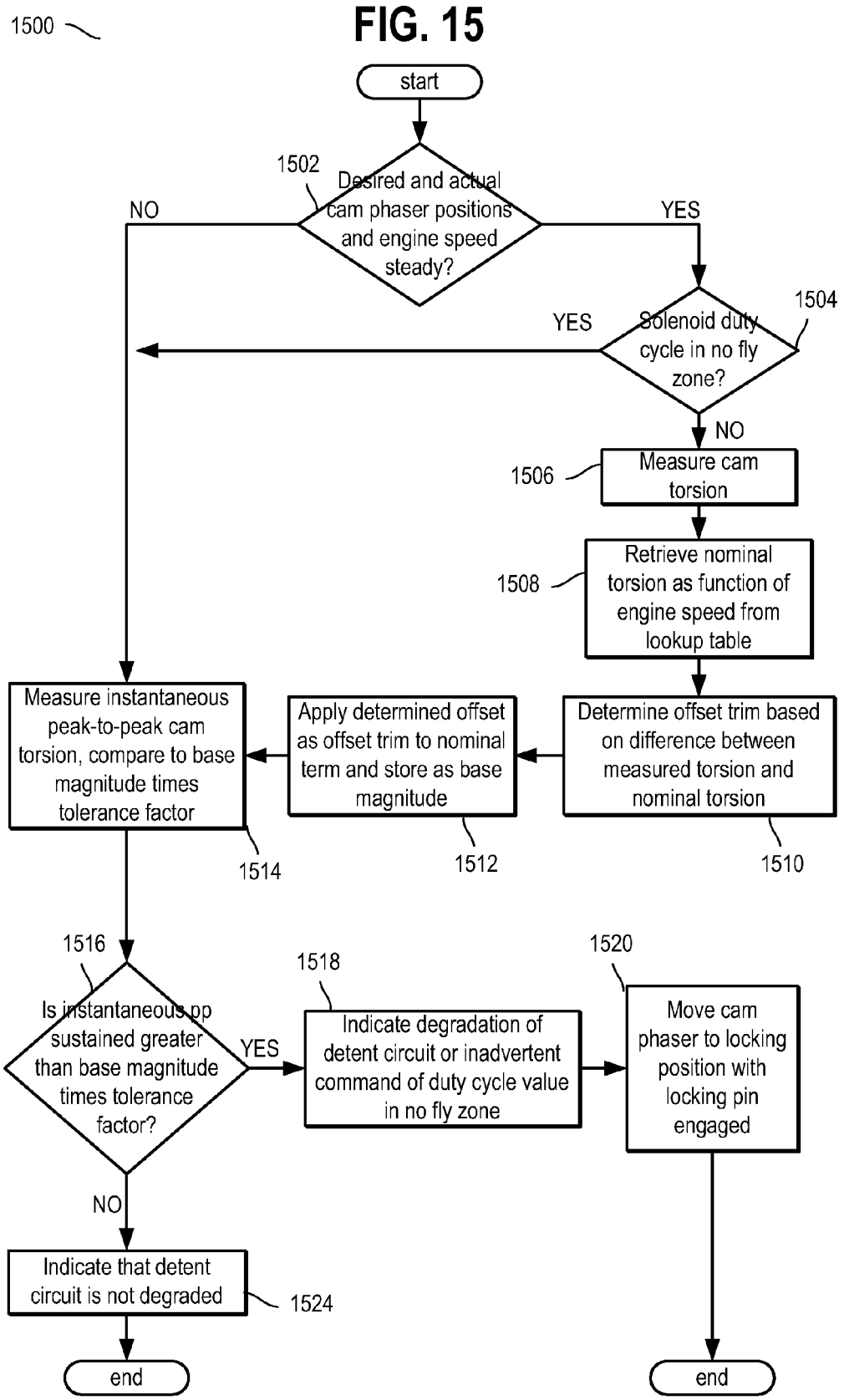

METHOD AND SYSTEM FOR VARIABLE CAM TIMING DEVICE

FIELD

The present application relates to methods for operating an engine with variable cam timing (VCT).

BACKGROUND AND SUMMARY

Internal combustion engines may use variable cam timing (VCT) to improve fuel economy and emissions performance of a vehicle. The VCT device may include a vane type cam phaser that is controlled by an electromechanically actuated spool valve. The spool valve may direct flow of a hydraulic fluid, such as oil, from one side of the vane to the other, such as from a retard chamber to an advance chamber. The VCT device may include more than one oil circuit connecting one side of the vane to the other through which the flow of a hydraulic fluid may be directed. The phaser may be oil pressure actuated, wherein the actuation of the phaser is dependent on oil pressure in the circuit. Alternatively, the phaser may be cam torque actuated wherein the actuation of the phaser is dependent on torque generated during cam actuation.

One example of a cam torque actuated VCT phaser is shown by Smith et al. in U.S. Pat. No. 8,356,583. Therein, the VCT device is configured with a hydraulically activated locking pin in an intermediate position (herein also referred to as a mid-lock position). Conventional VCT devices may include a locking pin at one end of the range of the phaser. The VCT device of Smith also utilizes two independent oil circuits, herein referred to as the phasing circuit and the detent circuit. In the mid-lock VCT phaser of Smith, a piloted valve is included in the phaser's rotor assembly and is moveable from a first position to a second position. When the piloted valve is in the first position, hydraulic fluid is blocked from flowing through the piloted valve. When the piloted valve is in the second position, hydraulic fluid is allowed to flow between a detent line from the advance chamber and a detent line from the retard chamber through the piloted valve and a common line, such that the rotor assembly is moved to and held in the intermediate phase angle position relative to the housing assembly. Detent lines communicating with the advance chamber or retard chamber are blocked when the VCT phaser is at or near the intermediate position. The spool valve has three regions of operation, namely Detent (or Auto-lock), Retard, and Advance in the specified order. Specifically, when the spool valve is commanded to the retard or advance regions, the piloted valve is in the first position, and fluid is blocked from flowing through the detent circuit lines. Additionally, fluid may flow from one side of the vane to the other via the phasing circuit lines. When the spool valve is commanded to the detent region, the piloted valve is in the second position, and fluid is free to flow from the advanced or retarded chamber, through the detent lines and the piloted valve, and into the opposite chamber through a common fluid line. Additionally, fluid is blocked from flowing through the phasing circuit lines.

However, the inventors herein have identified potential issues with such a VCT system. In the case of a cam torque actuated (CTA) mid-lock VCT phaser, when the spool valve is commanded to move into the retard or advance region, the detent circuit is prevented from "auto-locking" the cam phaser by the presence of high pressure oil going into the piloted valve. If either the spool valve is commanded to detent, or it is commanded to move into the retard, null, or advance region, and insufficient system oil pressure is present, the detent oil circuit may engage and attempt to hydraulically control the phaser back to the intermediate mid-lock position. If this occurs with low piloted valve oil pressure due to low system oil pressure, there may be a conflict between VCT position control and hydraulic control of the locking pin. Consequently, the phaser may be locked even when commanded to an advance or retard position. Alternatively, the phaser may not predictably respond to spool valve commands due to additional and erratic actuation via the flow of fluid through detent circuit lines. These problems may occur even when hydraulic pressure is sufficient to control the phaser via the phasing circuit lines. Either case may result in engine performance degradation.

In one example, the above issue may be at least partly addressed by a method for an engine, comprising moving cam timing via cam torque actuated hydraulic pressure separate from engine generated oil pressure via a spool valve and in response to system oil pressure falling below a threshold, adjusting a position of the spool valve to reduce the system oil pressure applied to a locking circuit of the phaser. In this way, inadvertent engagement and locking of the detent circuit can be averted.

As an example, an oil pressure of a VCT phaser may be monitored. During conditions when the oil pressure is below a threshold, the spool valve may be automatically commanded to the detent region so that the phaser may be directed to the mid-lock position and the locking pin may be engaged. In addition, commanding the spool valve to the advance or retard regions may be disallowed. The phaser may remain in the mid-lock position with the pin engaged until the oil pressure returns above the threshold pressure. In one example, if the oil pressure in the VCT phaser is low due to low bulk oil pressure, the engine controller may increase the engine idle speed to raise the bulk oil pressure sufficiently such that the VCT phaser oil pressure rises above the threshold. Once the oil pressure is sufficiently high, command of the spool valve to the advance or retard regions may again be allowed.

In this way, by actively commanding the spool valve to the auto-lock position responsive to low hydraulic fluid (e.g., oil) pressure, the spool valve may disallow VCT position controls to conflict with inadvertent engagement of the detent oil circuit due to the low oil pressure. Instead, the spool valve may only allow oil flow to be directed through the detent circuit until the oil pressure returns to the system. By intentionally engaging the detent circuit during low oil pressure conditions, the presence of competing oil flow through the phasing circuit lines is averted. Additionally, by commanding the spool valve to remain in the detent position until sufficient oil pressure returns to the system, inadvertent engagement of the detent circuit is avoided. Overall, engine performance is improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 15 depicts an example method for indicating degradation of a detent circuit of the VCT phaser responsive to variations in peak-to-peak cam torsion amplitudes.

DETAILED DESCRIPTION

Figure 1:
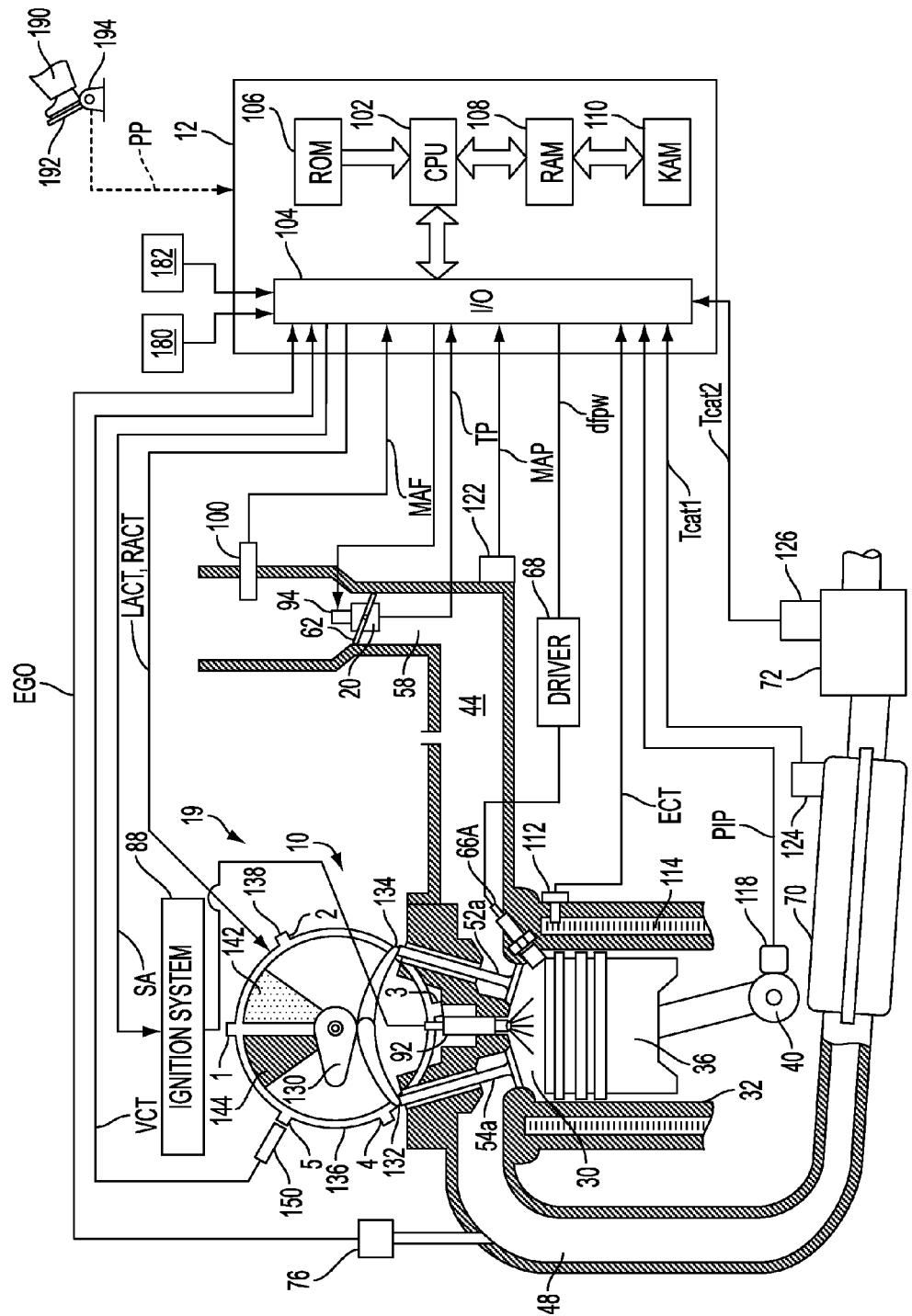
FIG. 1 shows an engine system including a variable cam timing device.
Figure 2:
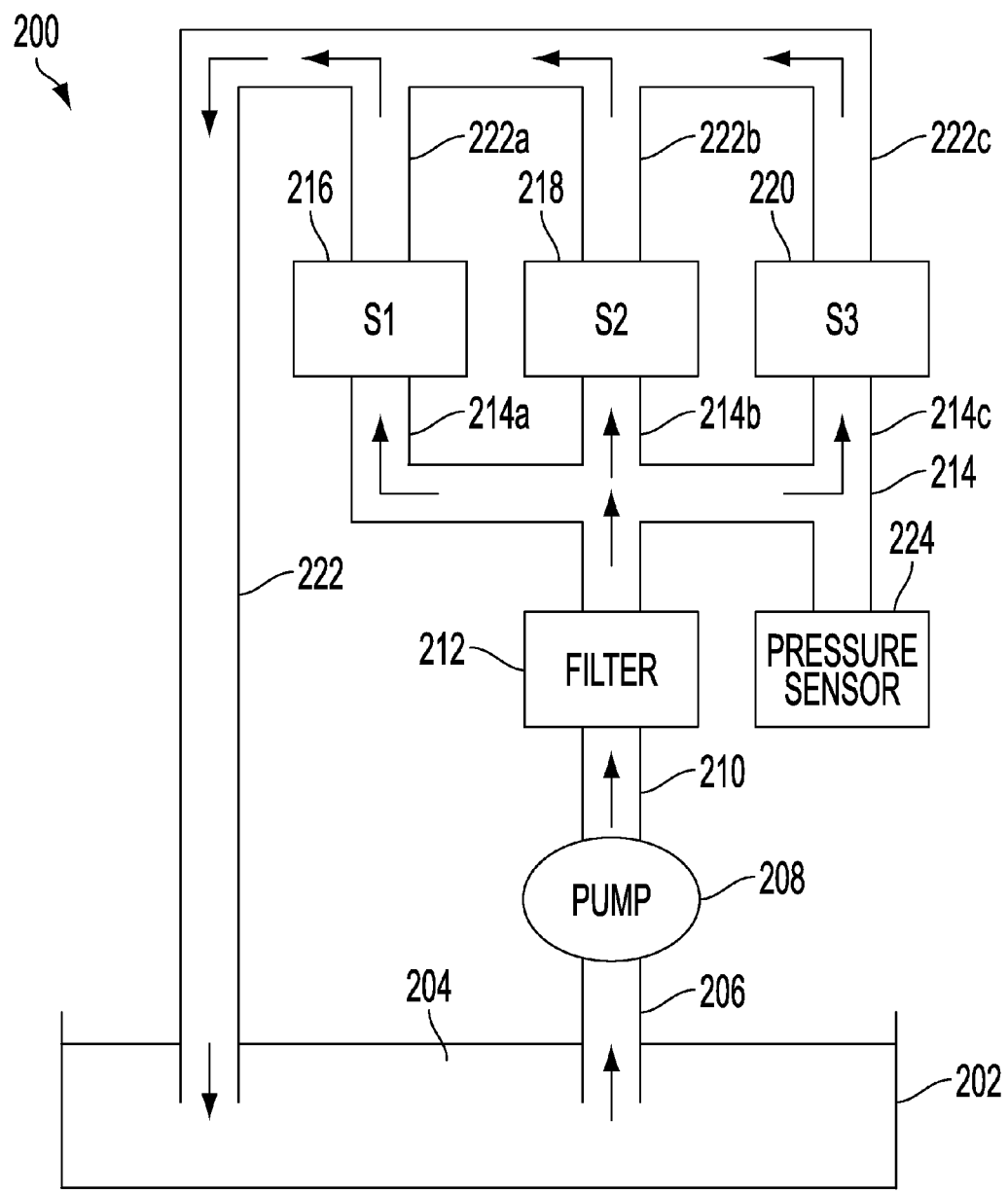
FIG. 2 shows a block diagram of an engine oil lubrication system.
Figure 3:
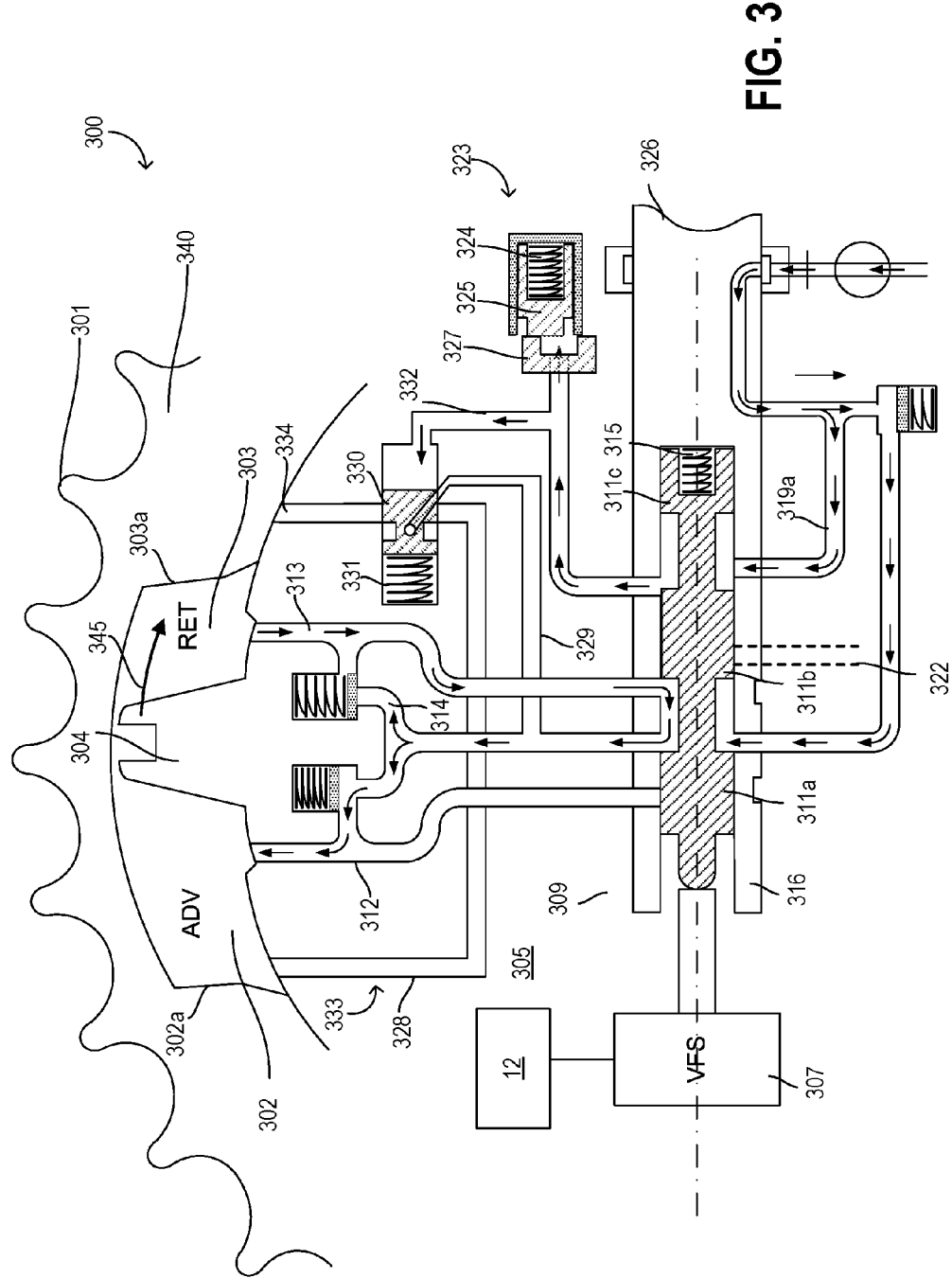
FIG. 3 shows an example VCT phaser system.

The following description relates to systems and methods for controlling an engine of a vehicle, the engine having a variable cylinder valve system, such as the variable cam timing (VCT) of FIGS. 1-3. An engine controller may be configured to adjust a duty cycle commanded to a spool valve of a VCT phaser to adjust the phaser position, as discussed at FIGS. 4-6. During conditions when the phaser is to be unlocked and moved, the controller may select a method for robustly unlocking the phaser while reducing phasing errors, such as depicted at FIGS. 7A-C and 8A-B. The controller may likewise adjust a spool valve command to enable accurate locking of the phaser in a position, as discussed at FIGS. 9-12. The controller may also intermittently map the spool valve so as to adaptively learn spool valve regions and accordingly update duty cycle commands for phaser positioning, as elaborated at FIGS. 13-14. Further still, the controller may use camshaft torsion variations to identify VCT system degradation in a timely manner, and accordingly perform mitigating operations, as discussed at FIG. 15. In this way, phasing errors are reduced and engine performance and exhaust emissions are improved.

FIG. 1 depicts an example embodiment of a combustion chamber or cylinder of internal combustion engine 10. FIG. 1 shows that engine 10 may receive control parameters from a control system including controller 12, as well as input from a vehicle operator 190 via an input device 192. In this example, input device 192 includes an accelerator pedal and a pedal position sensor 194 for generating a proportional pedal position signal PP.

Cylinder (herein also "combustion chamber") 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of the passenger vehicle via a transmission system. Further, a starter motor may be coupled to crankshaft 40 via a flywheel to enable a starting operation of engine 10. Crankshaft 40 is coupled to oil pump 208 (FIG. 2) to pressurize the engine oil lubrication system 200 (the coupling of crankshaft 40 to oil pump 208 is not shown). Housing 136 is hydraulically coupled to crankshaft 40 via a timing chain or belt (not shown).

Cylinder 30 can receive intake air via intake manifold or air passages 44, 58. Intake air passages 44, 58 can communicate with other cylinders of engine 10 in addition to cylinder 30. In some embodiments, one or more of the intake passages may include a boosting device such as a turbocharger or a supercharger. A throttle system including a throttle plate 62 may be provided along an intake passage of the engine for varying the flow rate and/or pressure of intake air provided to the engine cylinders. In this particular example, throttle plate 62 is coupled to electric motor 94 so that the position of elliptical throttle plate 62 is controlled by controller 12 via electric motor 94. This configuration may be referred to as electronic throttle control (ETC), which can also be utilized during idle speed control.

Combustion chamber 30 is shown communicating with intake manifold 44 and exhaust manifold 48 via respective intake valves 52a and 52b (not shown), and exhaust valves 54a and 54b (not shown). Thus, while four valves per cylinder may be used, in another example, a single intake and single exhaust valve per cylinder may also be used. In still another example, two intake valves and one exhaust valve per cylinder may be used.

Exhaust manifold 48 can receive exhaust gases from other cylinders of engine 10 in addition to cylinder 30. Exhaust gas sensor 76 is shown coupled to exhaust manifold 48 upstream of catalytic converter 70 (where sensor 76 can correspond to various different sensors). For example, sensor 76 may be any of many known sensors for providing an indication of exhaust gas air/fuel ratio such as a linear oxygen sensor, a UEGO, a two-state oxygen sensor, an EGO, a HEGO, or an HC or CO sensor. Emission control device 72 is shown positioned downstream of catalytic converter 70. Emission control device 72 may be a three-way catalyst, a NOx trap, various other emission control devices or combinations thereof.

In some embodiments, each cylinder of engine 10 may include a spark plug 92 for initiating combustion. Ignition system 88 can provide an ignition spark to combustion chamber 30 via spark plug 92 in response to spark advance signal SA from controller 12, under select operating modes. However, in some embodiments, spark plug 92 may be omitted, such as where engine 10 may initiate combustion by auto-ignition or by injection of fuel, as may be the case with some diesel engines.

In some embodiments, each cylinder of engine 10 may be configured with one or more fuel injectors for providing fuel thereto. As a non-limiting example, fuel injector 66A is shown coupled directly to cylinder 30 for injecting fuel directly therein in proportion to the pulse width of signal dfpw received from controller 12 via electronic driver 68. In this manner, fuel injector 66A provides what is known as direct injection (hereafter also referred to as "DI") of fuel into cylinder 30. The fuel injector may be mounted in the side of the combustion chamber (as shown) or in the top of the combustion chamber (near the spark plug), for example. Fuel may be delivered to fuel injector 66A by a fuel system including a fuel tank, a fuel pump, and a fuel rail. In some embodiments, combustion chamber 30 may alternatively or additionally include a fuel injector arranged in intake manifold 44 in a configuration that provides what is known as port injection of fuel into the intake port upstream of combustion chamber 30.

Controller 12 is shown as a microcomputer, including microprocessor unit 102, input/output ports 104, an electronic storage medium for executable programs and calibration values shown as read only memory chip 106 in this particular example, random access memory 108, keep alive memory 110, and a conventional data bus. Controller 12 is shown receiving various signals from sensors coupled to engine 10, in addition to those signals previously discussed, including measurement of inducted mass air flow (MAF) from mass air flow sensor 100 coupled to throttle 20; engine coolant temperature (ECT) from temperature sensor 112 coupled to cooling sleeve 114; a profile ignition pickup signal (PIP) from Hall effect sensor 118 coupled to crankshaft 40; and throttle position TP from throttle position sensor 20; absolute Manifold Pressure Signal MAP from sensor 122; an indication of knock from knock sensor 182; and an indication of absolute or relative ambient humidity from sensor 180. Engine speed signal RPM is generated by controller 12 from signal PIP in a conventional manner and manifold pressure signal MAP from a manifold pressure sensor provides an indication of vacuum, or pressure, in the intake manifold. During stoichiometric operation, this sensor can give an indication of engine load. Further, this sensor, along with engine speed, can provide an estimate of charge (including air) inducted into the cylinder. In one example, sensor 118, which is also used as an engine speed sensor, produces a predetermined number of equally spaced pulses every revolution of the crankshaft.

In this particular example, temperature $T_{cat1}$ of catalytic converter 70 is provided by temperature sensor 124 and temperature $T_{cat2}$ of emission control device 72 is provided by temperature sensor 126. In an alternate embodiment, temperature Tcat1 and temperature Tcat2 may be inferred from engine operation.

Continuing with FIG. 1, a variable camshaft timing (VCT) system 19 is shown. In this example, an overhead cam system is illustrated, although other approaches may be used Specifically, camshaft 130 of engine 10 is shown communicating with rocker arms 132 and 134 for actuating intake valves 52a, 52b and exhaust valves 54a, 54b. In the depicted example, VCT system 19 is cam-torque actuated (CTA), wherein actuation of a camshaft phaser of the VCT system is enabled via cam torque pulses. In alternate examples, VCT system 19 may be oil-pressure actuated (OPA). By adjusting a plurality of hydraulic valves to thereby direct a hydraulic fluid, such as engine oil, into the cavity (such as an advance chamber or a retard chamber) of a camshaft phaser, valve timing may be changed, that is advanced or retarded. As further elaborated herein, the operation of the hydraulic control valves may be controlled by respective control solenoids. Specifically, an engine controller may transmit a signal to the solenoids to move a spool valve that regulates the flow of oil through the phaser cavity. As used herein, advance and retard of cam timing refer to relative cam timings, in that a fully advanced position may still provide a retarded intake valve opening with regard to top dead center, as just an example.

Camshaft 130 is hydraulically coupled to housing 136. Housing 136 forms a toothed wheel having a plurality of teeth 138. In the example embodiment, housing 136 is mechanically coupled to crankshaft 40 via a timing chain or belt (not shown). Therefore, housing 136 and camshaft 130 rotate at a speed substantially equivalent to each other and synchronous to the crankshaft. In an alternate embodiment, as in a four stroke engine, for example, housing 136 and crankshaft 40 may be mechanically coupled to camshaft 130 such that housing 136 and crankshaft 40 may synchronously rotate at a speed different than camshaft 130 (e.g. a 2:1 ratio, where the crankshaft rotates at twice the speed of the camshaft). In the alternate embodiment, teeth 138 may be mechanically coupled to camshaft 130. By manipulation of the hydraulic coupling as described herein, the relative position of camshaft 130 to crankshaft 40 can be varied by hydraulic pressures in retard chamber 142 and advance chamber 144. By allowing high pressure hydraulic fluid to enter retard chamber 142, the relative relationship between camshaft 130 and crankshaft 40 is retarded. Thus, intake valves 52a, 52b and exhaust valves 54a, 54b open and close at a time later than normal relative to crankshaft 40. Similarly, by allowing high pressure hydraulic fluid to enter advance chamber 144, the relative relationship between camshaft 130 and crankshaft 40 is advanced. Thus, intake valves 52a, 52b, and exhaust valves 54a, 54b open and close at a time earlier than normal relative to crankshaft 40.

While this example shows a system in which the intake and exhaust valve timing are controlled concurrently, variable intake cam timing, variable exhaust cam timing, dual independent variable cam timing, dual equal variable cam timing, or other variable cam timing may be used. Further, variable valve lift may also be used. Further, camshaft profile switching may be used to provide different cam profiles under different operating conditions. Further still, the valvetrain may be roller finger follower, direct acting mechanical bucket, electrohydraulic, or other alternatives to rocker arms.

Continuing with the variable cam timing system, teeth 138, rotating synchronously with camshaft 130, allow for measurement of relative cam position via cam timing sensor 150 providing signal VCT to controller 12. Teeth 1, 2, 3, and 4 may be used for measurement of cam timing and are equally spaced (for example, in a V-8 dual bank engine, spaced 90 degrees apart from one another) while tooth 5 may be used for cylinder identification. In addition, controller 12 sends control signals (LACT, RACT) to conventional solenoid valves (not shown) to control the flow of hydraulic fluid either into retard chamber 142, advance chamber 144, or neither.

Relative cam timing can be measured in a variety of ways. In general terms, the time, or rotation angle, between the rising edge of the PIP signal and receiving a signal from one of the plurality of teeth 138 on housing 136 gives a measure of the relative cam timing. For the particular example of a V-8 engine, with two cylinder banks and a five-toothed wheel, a measure of cam timing for a particular bank is received four times per revolution, with the extra signal used for cylinder identification.

As described above, FIG. 1 merely shows one cylinder of a multi-cylinder engine, and that each cylinder has its own set of intake/exhaust valves, fuel injectors, spark plugs, etc.

FIG. 2 shows an example embodiment of an engine oil lubrication system 200 with an oil pump 208 coupled to crankshaft 40 (not shown), and including various oil subsystems (S1-S3) 216, 218, and 220. The oil subsystem may utilize oil flow to perform some function, such as lubrication, actuation of an actuator, etc. For example, one or more of the oil subsystems 216, 218, 220 may be hydraulic systems with hydraulic actuators and hydraulic control valves. Further, the oil subsystems 216, 218, 220 may be lubrication systems, such as passageways for delivering oil to moving components, such as the camshafts, cylinder valves, etc. Still further non-limiting examples of oil subsystems are camshaft phasers, cylinder walls, miscellaneous bearings, etc.

Oil is supplied to the oil subsystem through a supply channel and oil is returned through a return channel. In some embodiments, there may be fewer or more oil subsystems.

Continuing with FIG. 2, the oil pump 208, in association with the rotation of crankshaft 40 (not shown), sucks oil from oil reservoir 204, stored in oil pan 202, through supply channel 206. Oil is delivered from oil pump 208 with pressure through supply channel 210 and oil filter 212 to main galley 214. The pressure within the main galley 214 is a function of the force produced by oil pump 208 and the flow of oil entering each oil subsystem 216, 218, 220 through supply channels 214a, 214b, 214c, respectively. Oil returns to oil reservoir 204 at atmospheric pressure through return channel 222 via 222a, 222b, and 222c. Oil pressure sensor 224 measures main galley oil pressure and sends the pressure data to controller 12 (not shown). Pump 208 may be an engine driven pump, the pump output higher at higher engine speeds and lower at lower engine speeds.

The level of the main galley oil pressure can affect the performance of one or more of the oil subsystems 216, 218, 220, for example the force generated by a hydraulic actuator is directly proportional to the oil pressure in the main galley. When oil pressure is high, the actuator may be more responsive; when oil pressure is low, the actuator may be less responsive. Low oil pressure may also limit the effectiveness of engine oil to lubricate moving components. For example, if the main galley oil pressure is below a threshold pressure, a reduced flow of lubricating oil may be delivered, and component degradation may occur.

Additionally, the main galley oil pressure is highest when there is no or reduced flow of oil out of the main galley. Thus, leakage of hydraulic actuators in the oil subsystems can reduce main galley oil pressure. Further, one particular source of oil leakage can occur in the variable cam timing phaser, as described in further detail with regard to FIG. 3.

FIG. 3 shows a VCT phaser 300 in an advanced position. In one example, VCT phaser 300 is an example embodiment of a phaser of VCT system 19 of FIG. 1. FIG. 3 further depicts a solenoid-operated spool valve 309 coupled to VCT phaser 300. Spool valve 309 is shown positioned in an advance region of the spool as a non-limiting example. It will be appreciated that the spool valve may have an infinite number of intermediate positions, such as positions in an advance region, null region, and detent region of the spool (as elaborated below). The position of the spool valve may not only control a direction of VCT phaser motion but, depending on the discrete spool position, may also control the rate of VCT phaser motion.

Internal combustion engines have employed various mechanisms to vary the angle between the camshaft and the crankshaft for improved engine performance or reduced emissions. The majority of these variable camshaft timing (VCT) mechanisms use one or more "vane phasers" on the engine camshaft (or camshafts, in a multiple-camshaft engine), such as VCT phaser 300. VCT phaser 300 may have a rotor 305 with one or more vanes 304, mounted to the end of a crankshaft 326, surrounded by a housing assembly 340 with the vane chambers into which the vanes fit. In an alternate example, vanes 304 may be mounted to the housing assembly 340, and the chambers may be mounted in the rotor assembly 305. The housing's outer circumference 301 forms the sprocket, pulley or gear accepting drive force through a chain, belt, or gears, usually from the crankshaft, or from another camshaft in a multiple-cam engine.

VCT phaser 300 is depicted as a cam torque actuated phaser. Therein, torque reversals in the camshaft, caused by the forces of opening and closing engine valves, move the vane 304. The advance and retard chambers 302, 303 are arranged to resist positive and negative torque pulses in the camshaft 326 and are alternately pressurized by the cam torque. Spool valve 309 allows the vane 304 in the phaser to move by permitting fluid flow from the advance chamber 302 to the retard chamber 303 or vice versa, depending on the desired direction of movement. For example, when the desired direction of movement is in the advance direction, spool valve 309 allows the vane to move by permitting fluid flow from the retard chamber to the advance chamber. In comparison, when the desired direction of movement is in the retard direction, spool valve 309 allows the vane to move by permitting fluid flow from the advance chamber to the retard chamber.

The housing assembly 340 of VCT phaser 300 has an outer circumference 301 for accepting drive force. The rotor assembly 305 is connected to the camshaft 326 and is coaxially located within the housing assembly 340. The rotor assembly 305 has a vane 304 separating a chamber formed between the housing assembly 340 and the rotor assembly 305 into an advance chamber 302 and a retard chamber 303. The vane 304 is capable of rotation to shift the relative angular position of the housing assembly 340 and the rotor assembly 305. Additionally, a hydraulic detent circuit 333 and a locking pin circuit 323 are also present. The hydraulic detent circuit 333 and the locking pin circuit 323 are fluidly coupled making them essentially one circuit as discussed above, but will be discussed separately for simplicity and for better distinguishing their distinct functions. The hydraulic detent circuit 333 includes a spring 331 loaded piloted valve 330, an advance detent line 328 that connects the advance chamber 302 to the piloted valve 330 and a common line 314, and a retard detent line 334 that connects the retard chamber 303 to the piloted valve 330 and the common line 314. The advance detent line 328 and the retard detent line 334 are a predetermined distance or length from the vane 304. The piloted valve 330 is in the rotor assembly 305 and is fluidly connected to the locking pin circuit 323 and supply line 319a through connecting line 332. The locking pin circuit 323 includes a locking pin 325, connecting line 332, the piloted valve 330, supply line 319a, and exhaust line 322 (dashed lines).

The piloted valve may be actuated between two positions, a first position which may correspond to a closed or off position, and a second position which may correspond to an open or on position. The piloted valve may be commanded to these positions by the spool valve. In the first position, the piloted valve is pressurized by engine generated oil pressure in line 332, which positions the piloted valve such that fluid is blocked from flowing between the advance retard chambers through the piloted valve and the detent circuit 333. In the second position, engine generated oil pressure in line 332 is absent. The absence of pressure in line 332 enables spring 331 to position the piloted valve so that fluid is allowed to flow between the detent line from the advance chamber and the detent line from the retard chamber through the piloted valve and a common line, such that the rotor assembly is moved to and held in the locking position.

The locking pin 325 is slidably housed in a bore in the rotor assembly 305 and has an end portion that is biased towards and fits into a recess 327 in the housing assembly 340 by a spring 324. Alternatively, the locking pin 325 may be housed in the housing assembly 340 and may be spring 324 biased towards a recess 327 in the rotor assembly 305. The opening and closing of the hydraulic detent circuit 333 and pressurization of the locking pin circuit 323 are both controlled by the switching/movement of spool valve 309.

Spool valve 309 includes a spool 311 with cylindrical lands 311a, 311b, and 311c slidably received in a sleeve 316 within a bore in the rotor 305 and pilots in the camshaft 326. One end of the spool contacts spring 315 and the opposite end of the spool contacts a pulse width modulated variable force solenoid (NTS) 307. The solenoid 307 may also be linearly controlled by varying duty cycle, current, voltage or other methods as applicable. Additionally, the opposite end of the spool 311 may contact and be influenced by a motor, or other actuators.

The position of the spool 311 is influenced by spring 315 and the solenoid 307 controlled by controller 12. Further detail regarding control of the phaser is discussed below. The position of the spool 311 controls the motion of the phaser, including a direction of motion as well as a rate of motion. For example, the position of the spool determines whether to move the phaser towards the advance position, towards a holding position, or towards the retard position. In addition, the position of the spool determines whether the locking pin circuit 323 and the hydraulic detent circuit 333 are open (on) or closed (off). In other words, the position of the spool 311 actively controls piloted valve 330. The spool valve 309 has an advance mode, a retard mode, a null mode, and a detent mode. These modes of control may be directly associated with regions of positioning. Thus, particular regions of the spool valve's stroke may allow the spool valve to operate in the advance, retard, null and detent modes. In the advance mode, the spool 311 is moved to a position in the advance region of the spool valve, thereby enabling fluid to flow from the retard chamber 303 through the spool 311 on to the advance chamber 302, while fluid is blocked from exiting the advance chamber 302. In addition, the detent circuit 333 is held off or closed. In the retard mode, the spool 311 is moved to a position in the retard region of the spool valve, thereby enabling fluid to flow from the advance chamber 302 through the spool 311 on to the retard chamber 303, while fluid is blocked from exiting the retard chamber 303. In addition, the detent circuit 333 is held off or closed. In the null mode, the spool 311 is moved to a position in the null region of the spool valve, thereby blocking the exit of fluid from each of the advance and retard chambers 302, 303, while continuing to hold the detent circuit 333 off or closed. In the detent mode, the spool is moved to a position in the detent region. In the detent mode, three functions occur simultaneously. The first function in the detent mode is that the spool 311 moves to a position in which spool land 311b blocks the flow of fluid from line 312 in between spool lands 311a and 311b from entering any of the other lines and line 313, effectively removing control of the phaser from the spool valve 309. The second function in detent mode is the opening or turn on of the detent circuit 333. As such, the detent circuit 333 has complete control over the phaser moving to advance or retard positions, until the vane 304 reaches an intermediate phase angle position. The third function in the detent mode is to vent the locking pin circuit 323, allowing the locking pin 325 to engage in the recess 327. The intermediate phase angle position, herein also referred to as the mid-lock position and also as the locking position, is defined as a position when the vane 304 is between advance wall 302a and retard wall 303a, the walls defining the chamber between the housing assembly 340 and the rotor assembly 305. The locking position may be a position anywhere between the advance wall 302a and retard wall 303a and is determined by a position of detent passages 328 and 334 relative to the vane 304. Specifically, the position of detent passages 328 and 334 relative to the vane 304 define a position wherein neither passage may be exposed to advance and retard chambers 302 and 303, thus fully disabling communication between the two chambers when the piloted valve is in the second position and the phasing circuit is disabled. Commanding the spool valve to the detent region may also be referred to herein as commanding a "hard lock" or "hard locking" the cam phaser, in reference to the hardware component (locking pin) involved in locking the cam phaser being engaged at the mid-lock position.

Based on the duty cycle of the pulse width modulated variable force solenoid 307, the spool 311 moves to a corresponding position along its stroke. In one example, when the duty cycle of the variable force solenoid 307 is approximately 30%, 50% or 100%, the spool 311 is moved to positions that correspond with the retard mode, the null mode, and the advance mode, respectively and the piloted valve 330 is pressurized and moved from the second position to the first position, while the hydraulic detent circuit 333 is closed, and the locking pin 325 is pressurized and released. As another example, when the duty cycle of the variable force solenoid 307 is set to 0%, the spool 311 is moved to the detent mode such that the piloted valve 330 vents and moves to the second position, the hydraulic detent circuit 333 is opened, and the locking pin 325 is vented and engaged with the recess 327. By choosing a duty cycle of 0% as the extreme position along the spool stroke to open the hydraulic detent circuit 333, vent the piloted valve 330, and vent and engage the locking pin 325 with the recess 327, in the event that power or control is lost, the phaser may default to a locked position, improving cam phaser position certainty. It should be noted that the duty cycle percentages listed above are provided as non-limiting examples, and in alternate embodiments, different duty cycles may be used to move the spool of the spool valve between the different spool regions. For example, the hydraulic detent circuit 333 may alternatively be opened, the piloted valve 330 vented, and the locking pin 325 vented and engaged with the recess 327 at 100% duty cycle. In this example, the detent region of the spool valve may be adjacent to the advance region instead of the retard region. In another example, the detent mode may be at a 0% duty cycle, and duty cycles of approximately 30%, 50%, and 100% may move spool 311 to positions that correspond with the advance mode, the null mode, and the retard mode. Likewise in this example, the advance region of the spool valve is adjacent to the detent region.

During selected conditions, a controller may map one or more regions of the spool by varying the duty cycle commanded to the spool valve and correlating it with corresponding changes in phaser position. For example, as elaborated with reference to FIGS. 13-14, a transitional region between the detent region and the retard region of the spool, herein also referred to as the "no-fly zone", may be mapped by correlating motion of the spool valve out of the detent region into the retard region with motion of the phaser from the mid-lock position towards a retarded position. In alternate embodiments, when the detent region is adjacent to the advance region, the "no-fly zone" may be between the detent region and the advance region of the spool.

FIG. 3 shows phaser 300 moving towards the advance position. To move the phaser towards the advance position, the duty cycle of the spool valve is increased to greater than 50%, and optionally up to 100%. As a result, the force of the solenoid 307 on the spool 311 is increased, and the spool 311 is moved to the right, towards an advance region and operated in an advance mode, until the force of the spring 3115 balances the force of the solenoid 307. In the advance mode shown, spool land 311a blocks line 312 while lines 313 and 314 are open. In this scenario, camshaft torque pulses pressurize the retard chamber 303, causing fluid to move from the retard chamber 303 into advance chamber 302, thereby moving vane 304 in the direction shown by arrow 345. Hydraulic fluid exits from the retard chamber 303 through line 313 to the spool valve 309, between spool lands 311a and 311b and recirculates back to central line 314 and line 312 leading to the advance chamber 302. The piloted valve is held in the first position, blocking detent lines 328 and 334.

In an alternate example, to move towards the phaser towards the retard position, the duty cycle of the spool valve is decreased to lower than 50%, and optionally up to 30%. As a result, the force of the solenoid 307 on the spool 311 is decreased, and the spool 311 is moved to the left, towards a retard region and operated in a retard mode, until the force of the spring 315 balances the force of the solenoid 307. In the retard mode, spool land 311b blocks line 313 while lines 312, and 314 are open. In this scenario, camshaft torque pulses pressurize the advance chamber 302, causing fluid to move from the advance chamber 302 into retard chamber 303, and thereby moving vane 304 in a direction opposite to that shown by arrow 345. Hydraulic fluid exits from the advance chamber 302 through line 3112 to the spool valve 309, between spool lands 311a and 311b and recirculates back to central line 314 and line 313 leading to the retard chamber 303. The piloted valve is held in the first position, blocking detent lines 328 and 334.

In a further example, to move the phaser to, and lock in, the intermediate phase angle (or mid-lock) position, the duty cycle of the spool valve is decreased to 0%. As a result, the force of the solenoid 307 on the spool 311 is decreased, and the spool 311 is moved to the left, towards a detent region and operated in a detent mode, until the force of the spring 315 balances the force of the solenoid 307. In the detent mode, spool land 311b blocks lines 312, 313, and 314, and spool land 311c blocks line 319a from pressurizing line 332 to move the piloted valve to the second position. In this scenario, camshaft torque pulses do not provide actuation. Instead, hydraulic fluid exits from the advance chamber 302 through detent line 328 to the piloted valve 330, through the common line 329 and recirculates back to central line 314 and line 313 leading to the retard chamber 303.

Figure 4:
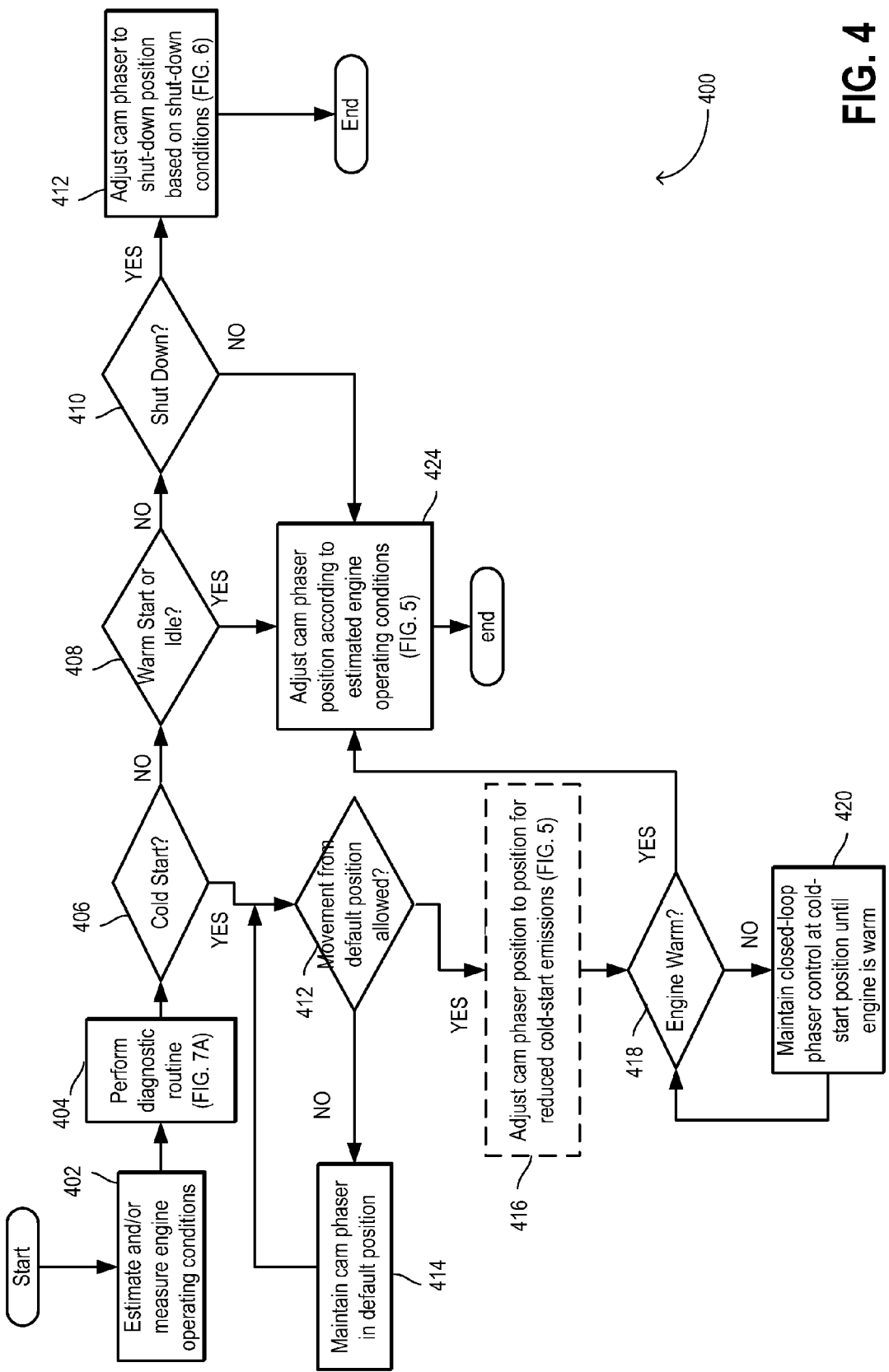
FIG. 4 shows a high level flow chart for sending a VCT phaser command to adjust cam timing based on engine operating conditions.

Now turning to FIG. 4, an example routine 400 is described for adjusting the operation of a VCT cam phaser based on changes in engine operating conditions. Routine 400 may be executed by an engine controller, such as controller 12 of FIGS. 1-3, upon the start of a vehicle drive cycle in order to ensure proper cam phasing throughout the drive cycle.

The routine includes, at 402, after the engine has been started, estimating and/or measuring engine operating conditions. These may include, for example, engine speed, engine temperature, ambient conditions (ambient temperature, pressure, humidity, etc.), torque demand, manifold pressure, manifold air flow, canister load, exhaust catalyst conditions, oil temperature, oil pressure, soak time etc.

In one example, during the previous shutdown of the engine (as discussed at FIG. 6), and prior to the current engine restart, the cam phaser may have been adjusted to a selected position within its range to enable the phaser to be restarted in the selected position. The selected position may have been chosen in anticipation of a particular starting condition at the next drive cycle. In one example, the cam phaser may have been adjusted to a retarded position during the previous shutdown routine, in anticipation of a cold start. Alternatively, the cam phaser may have been adjusted to a retarded position during the previous shutdown to reduce spark detonation during start or runup on a hot engine or to reduce torque during startup for better load control and smoother starts. In another example, the cam phaser may have been adjusted to an advanced position during the previous shutdown routine, in anticipation of a cold start to increase compression heating to aid engine starting with low volatility fuels. In still another example, the cam phaser may have been adjusted to a mid-lock position without engaging the locking pin during the previous shutdown routine, in anticipation of large camshaft torsional pulses during rundown. As the spool valve moves towards the locked position and it traverses the retard (or advance) region (whichever is closer to the detent region), such torsional pulses could move the phaser farther from the mid-lock position and reduce the likelihood that the pin will be properly aligned to allow locking. In yet another example, the cam phaser may have been adjusted to the mid-lock position with the locking pin held engaged, in anticipation of the next startup event requiring a locked position phaser. The position to which the cam phaser was adjusted during the previous shutdown routine may hereupon be referred to as the "default position".

At 404, the routine includes executing a diagnostic routine, as elaborated at FIG. 7, to identify conditions that may lead to cam phaser performance degradation. In any such conditions are identified, the controller may set corresponding flags commanding the phaser to be locked with the locking pin engaged even if phaser locking was not otherwise requested. For instance, in response to detection of phaser hardware degradation, the locking pin may be engaged to avert improper control of the cam phaser position (wherein the commanded position of the phaser and the actual position of the phaser do not match). Still further examples are elaborated with reference to FIG. 7.

After completing the diagnostics at 404, the routine proceeds to 406 to determine if a cold start condition is present. Cold start conditions may be confirmed if the engine temperature or exhaust catalyst temperature is below a threshold temperature and/or if a threshold duration has elapsed since the preceding engine shutdown. If engine cold start conditions are confirmed, the routine proceeds to 412 wherein the engine controller may check if conditions allow for the repositioning of the cam phaser from the default position to a position for reducing cold-start exhaust emissions. For example, if the engine oil temperature is below a threshold, phaser movement may be delayed due to the higher viscosity of the oil in subsystem 220, which may lead to engine conditions and cam phaser positions becoming asynchronous. In some examples, the diagnostic routine performed at 404 may have set a flag indicating this condition (see FIG. 7 at 740), since asynchronization between engine conditions and cam phaser positions may result in combustion instability and degraded engine operation. In other examples, the diagnostic routine at 404 may have set a flag that camshaft sensors are degraded or solenoids are degraded, which would make closed loop control toward a cold-start position ineffective.

Figure 5:
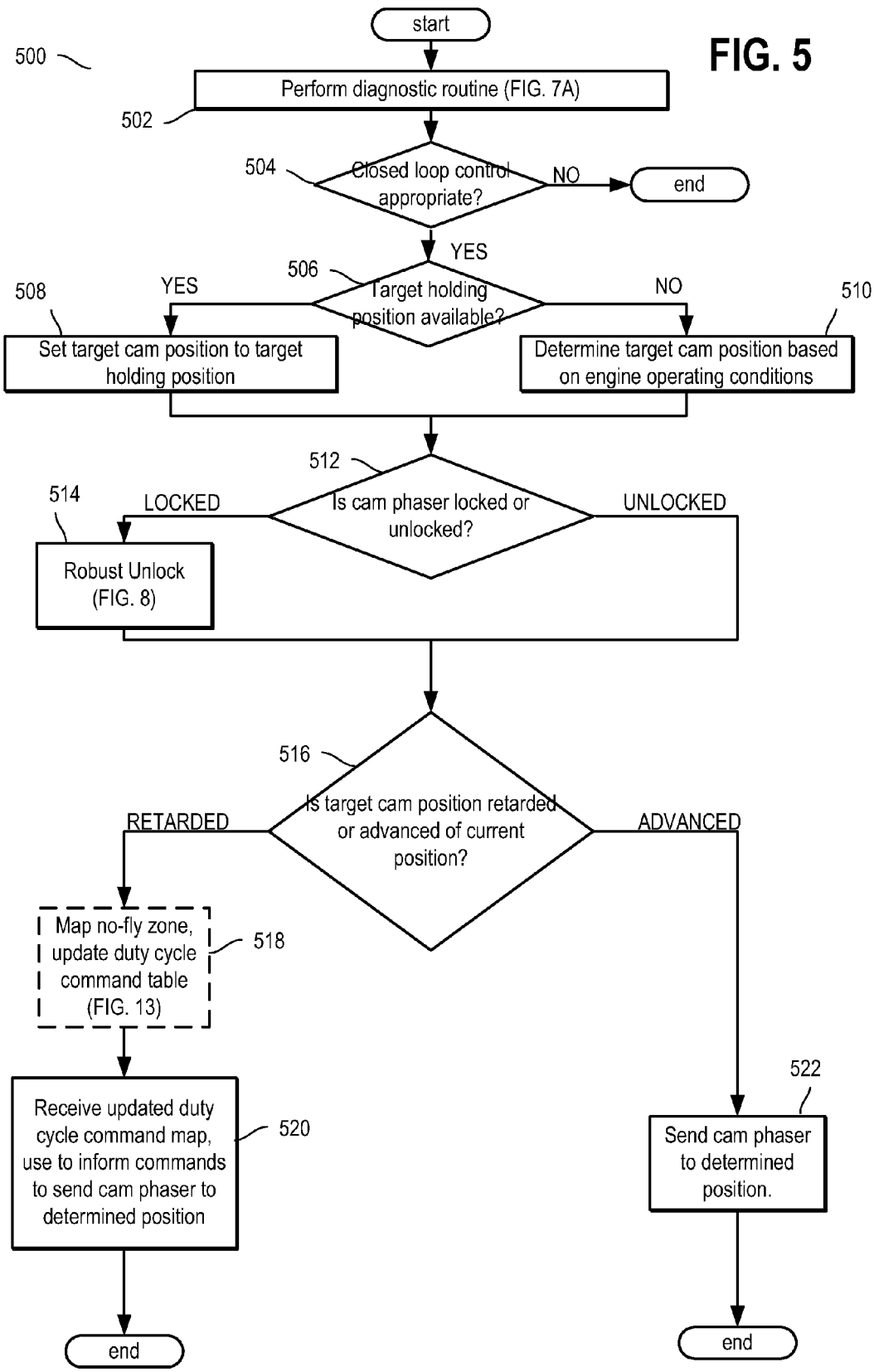
FIG. 5 depicts an example method for adjusting a cam position via adjustments to a spool valve duty cycle command.
Figure 6:
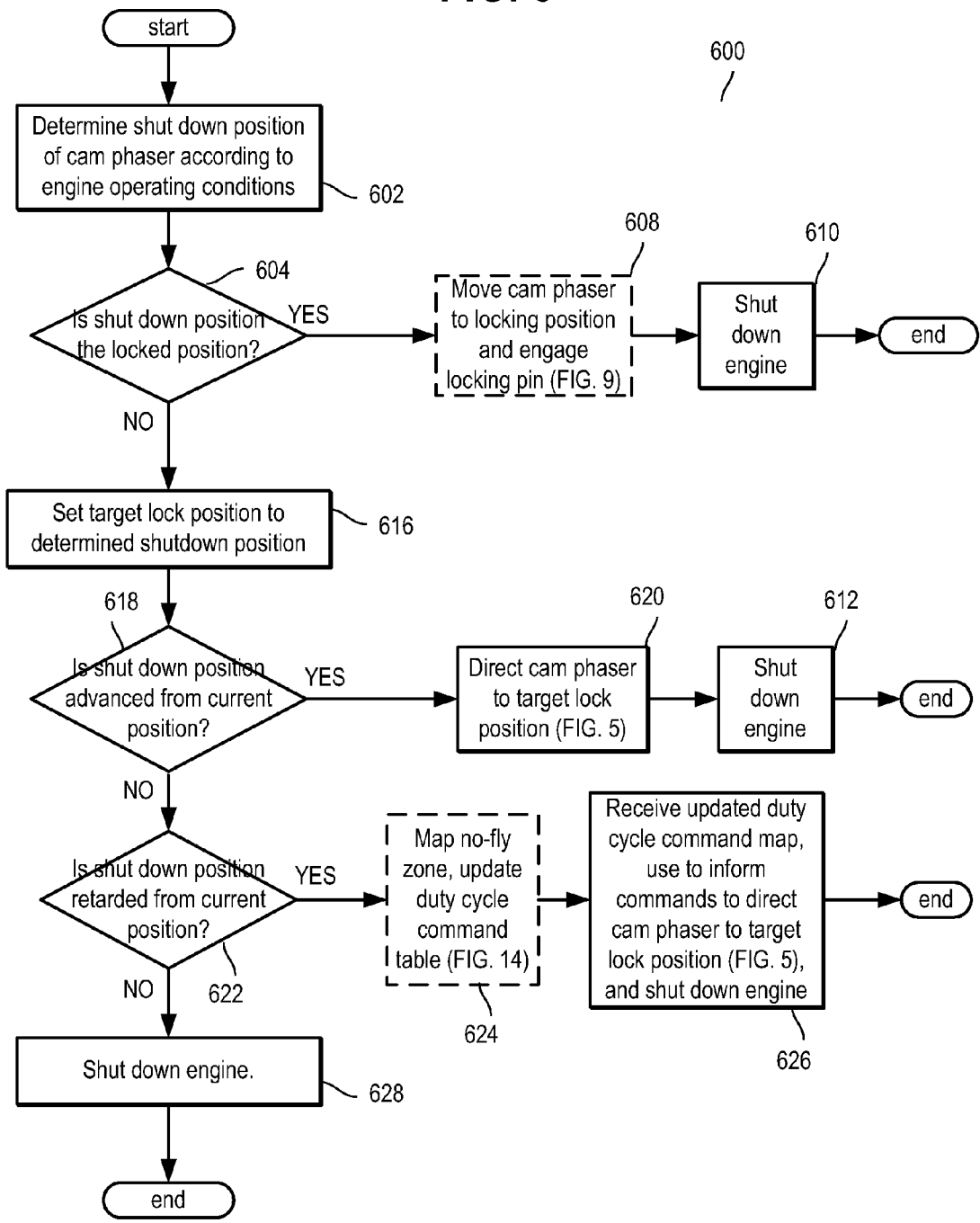
FIG. 6 depicts an example method for adjusting a cam phaser to a determined position prior to engine shutdown.

Continuing from 412, if engine operating conditions allow for the repositioning of the cam phaser, for example allowing for the repositioning to a position that reduces cold start emissions, the engine controller may command this positional adjustment at 416 according to routine 500 in FIG. 5. If conditions do not allow for the repositioning of the cam phaser, the controller may maintain the cam phaser in the default position at 414 until conditions allow for the repositioning of the cam phaser, for example until the engine has been sufficiently warmed. If the default position is one in which the locking pin is not engaged, maintaining the cam phaser in the default position may involve a fixed position command at the default position under closed-loop control, a method which may be executed according to routine 500. If the default position is the locking position with the locking pin engaged, the phaser may be held in the default position with the locking pin engaged until conditions allow for the repositioning of the cam phaser or the unlocking of the locking pin.

Continuing at 418, the engine controller may determine if the engine has warmed sufficiently, such as by determining if the exhaust catalyst is above a light-off temperature. If the engine is warm, the controller may adjust the cam phaser according to engine operating conditions at 424. Once this operation has been commanded, the cam phaser may operate under closed-loop control until conditions dictate otherwise. Once the engine is warm, the cam phaser position may be adjusted to provide optimal performance and fuel economy. If the engine is not yet warm at 418, the retarded cam phaser position may be maintained at 420 until the engine has become warm.

Continuing at 406, if engine operating conditions do not indicate cold start conditions, the controller may determine at 408 whether warm start conditions or idle conditions are met. If warm start conditions or idle conditions are met, the controller is able to adjust the cam phaser according to engine operating conditions at 424. Once this operation has been commanded, the cam phaser may operate under closed-loop control until conditions dictate otherwise. The routine then exits.

Continuing at 408, if engine operating conditions do not indicate warm start conditions or idle conditions, the controller may determine at 410 whether shut down conditions are met. If shut down conditions are met, the controller may determine a proper shutdown position for phaser based on the current engine operating conditions, and adjust the cam phaser to the determined shutdown position as directed by routine 600 in FIG. 6. The routine then exits.

FIG. 5 depicts a routine 500 for general closed loop control of the cam phaser position. The routine begins at 502 with an initial diagnostic routine as described in FIG. 7, which may activate or deactivate flags that indicate which type of cam phasing is appropriate for the current engine conditions. For example, a first flag may indicate that closed-loop control should not be executed and the cam phaser should instead be directed to the mid-lock position with the locking pin engaged, while a different flag may indicate that the phaser should be held in a particular position without the locking pin engaged. The position at which the cam phaser is to be held without the locking pin engaged may be a defined locking position (such as the mid-lock position) or a position advanced or retarded of the locking position. For instance, in response to detection of degradation of the cam position sensor, a flag may be set to disable closed-loop control of cam phaser position, and further commanding the cam phaser to be directed to the mid-lock position with the locking pin engaged. In another instance, in response to engine oil temperature being below a threshold, a flag may be activated to indicate that the cam phaser should be held at its current position without the locking pin engaged. As such, if a flag was active at the beginning of the diagnostic routine, the flag may be deactivated if a previously identified engine malfunction is resolved, allowing closed-loop control of cam phaser position to resume.

Continuing at 504, if diagnostic routine 700 sets a flag that indicates that closed loop control is not available for the current engine operating conditions, routine 500 may terminate. Otherwise, the method continues to 506, where it is determined if a target holding position has been determined and is available. If the diagnostic routine executed at 502 has activated a flag suggesting a target position at which the cam phaser is to be held, for instance the locking position, the target holding position may be set as the target cam position for this phasing routine at 508. It may be appreciated that the target holding position may be any position within the range of the cam phaser. As an example, the target holding position may be a position retarded of zero in the case that a shutdown command is executed and a cold start is expected. In this case, holding the phaser in target retarded position may provide higher engine efficiency during the cold start, a condition in which active phasing is not available. If a flag indicating a target holding position is not active at 506, the target cam position may be determined based on engine operating conditions at 510. It will be appreciated that the target cam position may be any position within the range of the cam phaser. For instance, if (the combination of engine conditions and driver pedal input indicates a request for performance, the target cam position may be set to an advanced position. However if engine conditions (e.g., cold oil temperature) indicate a target position is not available, the cam position may be set to a retarded position. As another example if the engine conditions and driver pedal input indicate a request for fuel economy, the target cam position may be set to a retarded position, however if engine conditions (e.g., at altitude) indicate a advanced cam position, then the target cam position is advanced. As another example (e.g., hot oil temperature) if the engine operating conditions and driver pedal input indicate a target cam position sufficiently near the default position, then the target position is at the mid-lock position without the locking pin engaged.

After determining the target position, at 512, the controller may determine whether the locking pin of the cam phaser is engaged. That is, the controller may determine if the cam phaser is locked or unlocked. In the event that closed-loop cam phasing is permissible but the locking pin is engaged, a robust unlock method 800 elaborated at FIG. 8 may be executed at 514 to allow the cam phaser to move to the target cam position.

Upon unlocking the phaser, at 516, the controller may determine whether the target cam phaser position is advanced or retarded of the current cam phaser position. Determination of the target cam phaser position relative to the current position may be based on comparing the target position to an output from a cam position sensor. In one example, where the target cam phaser position is the same position as the current cam phaser position (or less than a threshold distance away from the current position), the spool valve may be commanded to the null region (and operated in the hold mode) if it is not already in the null region in order to maintain the current position.

However, if the target cam phaser position is advanced from the current cam phaser position, the controller may command the cam phaser from its current position to the target position at 522 by operating spool valve 311 in the advanced mode and moving the spool to the advanced region of the spool valve. As discussed earlier, the spool position may be changed by adjusting the duty cycle commanded to the solenoid of the spool valve. Once the spool valve position is changed, cam torque actuated hydraulic pressure may be used to advance the cam phaser position. In particular, advanced cam torsion pulses may actuate flow of hydraulic fluid from the retard chamber of the phaser, through the phasing circuit, and into the advance chamber of the phaser. Advancing the cam phaser position may include moving the cam phaser position from an initial position that is more retarded (that is, further away from the retard chamber wall) to a final position that is less retarded (that is, further towards the retard chamber wall). In an alternate example, advancing the cam phaser position may include moving the cam phaser position from an initial retarded position to the locking position (the mid-lock position). In still another example, advancing the cam phaser position may include moving the cam phaser from an initially retarded position (in the retard region) to a final advanced position (in the advance region). In another further example, the cam phaser position may initially be the locking position, and the cam phaser may be advance to a target cam phaser position that is an advanced position. Further still, the cam phaser position may initially be a less advanced position (e.g., closer towards the advance chamber wall), and the cam phaser may be advanced to a target cam phaser position that is more advanced (e.g., further from the advance chamber wall). After this phasing command is executed, feedback from the resultant cam phaser position may be collected and used by the controller to determine whether a new phasing command is necessary to further adjust the cam phaser position in order to reach the target cam position value. For example, if the initial phaser position command does not result in a new cam phaser position that is within a specified tolerance of the target cam phaser position, a further command is delivered to move the cam phaser closer to the target phaser position. If additional cam phasing is necessary, routine 500 may be executed again.

In the case that the target cam phaser position is in a position retarded from the current cam phaser position, before moving the phaser to the requested position, the controller may selectively map a transitional region between the detent region and retard region of the spool valve, also defined herein as the "no-fly zone", to improve spool valve retard commands. The mapping may be performed at 518 (via routine 1300 elaborated at FIG. 13) before operating spool valve 311 in the retarded region of the duty cycle. The mapping may be performed selectively during retard commands where a threshold duration or distance has elapsed since a last iteration of the mapping, during a first number of retard commands executed since a start of the given vehicle drive cycle. The intermittent adaptive learning of the no-fly zone improves cam phaser position control by updating stored duty cycle values corresponding to different speeds of retardation that may be commanded by the engine controller. As such, if the duty cycle value for the largest retardation speed is inaccurate and the controller commands the duty cycle to this value, inadvertent engagement of the detent circuit may occur, which may result in unpredictable phasing movements. That is, the phaser may be locked in a current position when commanded to be moved to a retarded position.

It will be appreciated that in an alternate embodiment, the detent region may be adjacent to the advance region, in which case the controller may selectively map the no-fly zone if the target cam phaser position is in a position advanced from the current cam phaser position. The mapping may take place before commanding the cam phaser to the determined position at 522, and may improve spool valve advance commands. Upon mapping the no-fly zone and updating the duty cycle values for commanding spool valve 311 into the retarded region of spool valve operation, the controller may command the cam phaser from its current position to the target position at 520 by operating spool valve 311 in the retarded region of the duty cycle. Consequently, cam torque actuated hydraulic pressure may be used to retard the cam phaser position. In particular, retarded cam torsion pulses may actuate flow of hydraulic fluid from the advance chamber of the phaser, through the phasing circuit, and into the retard chamber of the phaser.

In one example, the cam phaser position may initially be at a more advanced position (further from the advance chamber wall), and the target cam phaser position may be a less advanced position but in the advance region of the phaser (closer towards the advance chamber wall). In another example, the cam phaser position may initially be an advanced position, and the target cam phaser position may be the locking position. In another instance, the cam phaser position may initially be an advanced position, and the target cam phaser position may be a retarded position (in the retard region of the phaser). In another example, the cam phaser position may initially be the locking position, and the target cam phaser position may be a retarded position. In still another example, the cam phaser position may initially be a less retarded position closer towards the retard chamber wall, and the target cam phaser position may be a more retarded position further from the retard chamber wall.

After the phasing command is executed, feedback from the resultant cam phaser position may be collected and used by the controller to determine whether a further phasing command is required to adjust the cam phaser position to the target cam position value. For example, if the initial command does not result in a cam phaser position that is within a specified tolerance of the target cam phaser position, additional cam phasing may be necessary, and routine 500 may be executed again to bring the cam phaser position closer to the target position via feedback control.

If shutdown conditions are determined to be present, such as at step 410 of routine 400, an example routine 600 may be executed to properly position the cam phaser in anticipation of various starting conditions of the next drive cycle. The target shutdown position may be determined at 602 based on engine operating conditions. For example, if ambient temperature sensor indicates that ambient temperature is very cold (below a lower threshold temperature), then the cams may be advanced at shutdown to achieve compression heating at the next start. As another example, if ambient conditions indicate a hot temperature (above a higher threshold temperature) then the cams may be retarded at shutdown to reduce the likelihood of engine detonation and achieve a smoother start at the next engine start. The shutdown position of the cam phaser may hereupon also be referred to as the "default position" when mentioned in context of the initial cam timing position at the start of the subsequent drive cycle. It will be appreciated that with a mid-lock VCT cam phaser, the shutdown position may be at any position within the range of the cam phaser. Further, the cam phaser may shut down at the locking position with the locking pin engaged, or at any position within the cam phaser range without the locking pin engaged, including at the locking position. It will be appreciated that a shutdown position at which the locking pin is not engaged enables the default position of the cam phaser to be somewhere other than the mid-lock position upon startup. In such an instance, the phaser may be held at this default position upon a subsequent startup via closed-loop cam timing control until the engine oil temperature has surpassed a critical temperature. A shut down at the mid-lock position with the locking pin engaged may be desirable to enable fast start times and reduced emissions for example). In another instance, a cold start may be anticipated for the next drive cycle, in which case the command of shut down in a retarded position may be desirable. Shutting down in a retarded position may indicate to the controller that the cam phaser should be held in this retarded position upon the subsequent startup of the engine.

Continuing at 604, it is determined if the shutdown position was a locked position. If the determined shutdown position is the locking position with the locking pin engaged, the cam phaser may be moved to the locking position if necessary, and the locking pin may be engaged to hold the cam phaser in the locking position at 608. In one example, the cam phaser may have been in a position other than the locking position without the locking pin engaged, in which case the spool valve may be moved to a detent region in order to move the cam phaser to the locking position. As elaborated at FIG. 9, the spool valve may be moved to the detent region according to method 900 in order to engage the locking pin. In an alternate example, the cam phaser may have been held at the locking position without the locking pin engaged, in which case the spool valve may be moved to the detent region according to method 900 in order to engage the locking pin. In still another example, the cam phaser may have been in the locking position with locking pin engaged before the shutdown position was determined, in which case no phasing movement may be necessary. It may be assumed that the shutdown position will be at the locking position with the locking pin engaged if the engine conditions at 602 do not allow for closed loop control of the phaser. After the cam phaser has been moved to the locking position and the locking pin has been engaged, the engine may shut down at 610, thus ending method 600.

Continuing from 604, if the shutdown position is not at the locking position with the locking pin engaged, the target cam position may be set at 616 to the shutdown position determined at 602. Different procedures may be followed thereafter to position the cam phaser based on the relative positions of the shutdown position and the current position of the cam phaser. In the case that the shutdown position is the same position as the current cam phaser position, the engine may be shut down at 628 without additional phasing beforehand, and method 600 will exit.

At 618, it may be determined if the shutdown position is advanced from the current position. In the case that the shutdown position is in a position advanced from the current cam phaser position, at 620 the engine controller may command the cam phaser from its current position to the shutdown position via method 500 in FIG. 5, with the shutdown position as the target position. Therein, the cam phaser may be advanced to the shutdown position by moving the spool valve into the advance region. In one instance, the cam phaser position may initially be a retarded position, and the shutdown position may be a less retarded position in the retarded region. In another instance, the cam phaser position may initially be a retarded position, and the shutdown position may be the locking position without the locking pin engaged. In another instance, the cam phaser position may initially be a retarded position, and the shutdown position may be an advanced position. In another instance, the cam phaser position may initially be the locking position, with or without the locking pin engaged, and the shutdown position may be an advanced position. In another instance, the cam phaser position may initially be an advanced position, and the shutdown position may be a more advanced position. After this phasing command is executed, feedback from the resultant cam phaser position may be collected and used by the controller to determine whether a new phasing command may be necessary to further adjust the cam phaser position toward the target cam position, i.e. if the initial commands did not result in a new cam phaser position within a specified tolerance of the shutdown position. If additional cam phasing is necessary, method 500 may be executed again with the fixed target position set as the shutdown position. Once the cam phaser has reached the shutdown position within a specified tolerance, the engine may shut down at 612, ending method 600.

In the case that the shutdown position is in a position retarded from the current cam phaser position, the controller may first need to adapt current knowledge of the "no-fly zone" at 624 (via method 1300) before operating the spool valve 311 in the retard region of the duty cycle. This adaptive learning may be advantageous to cam phaser control because the process updates stored duty cycle values which correspond to different speeds of retardation that may be commanded by engine controller 306. If the duty cycle value for the largest retardation speed is inaccurate and the controller commands the duty cycle to this value, inadvertent engagement of the detent circuit may occur, resulting in unpredictable phasing movements.

It will be appreciated that in an alternate example, the detent region may be adjacent to the advance region instead of the retard region, in which case adaptive learning of the no-fly zone may occur before 620, when the shutdown position is in a position advanced from the current cam phaser position. In this example, the learning process may update stored duty cycle values which correspond to different speeds of advancement that may be commanded by engine controller 306.

Once appropriate duty cycle values for commanding spool valve 311 in the retarded region of operation have been established, the controller may command the cam phaser at 626 from its current position to the shutdown position via method 500 in FIG. 5, with the target position set as the shutdown position. In one instance, the cam phaser position may initially be an advanced position, and the shutdown position may be a less advanced position in the retarded region. In another instance, the cam phaser position may initially be an advanced position, and the shutdown position may be the locking position without the locking pin engaged. In another instance, the cam phaser position may initially be an advanced position, and the shutdown position may be a retarded position. In another instance, the cam phaser position may initially be the locking position, with or without the locking pin engaged, and the shutdown position may be a retarded position. In another instance, the cam phaser position may initially be a retarded position, and the shutdown position may be a more retarded position. After this phasing command is executed, feedback from the resultant cam phaser position may be collected and used by the controller to determine whether a new phasing command may be necessary to further adjust the cam phaser position in order to reach the target cam position value, i.e. if the initial commands did not result in a new cam phaser position within a specified tolerance of the shutdown position. If additional cam phasing is necessary, routine 500 may be executed with the fixed target position as the shutdown position. Once the cam phaser has reached the shutdown position within a specified tolerance, the engine may shut down at 626, ending method 600.

Figure 7A:
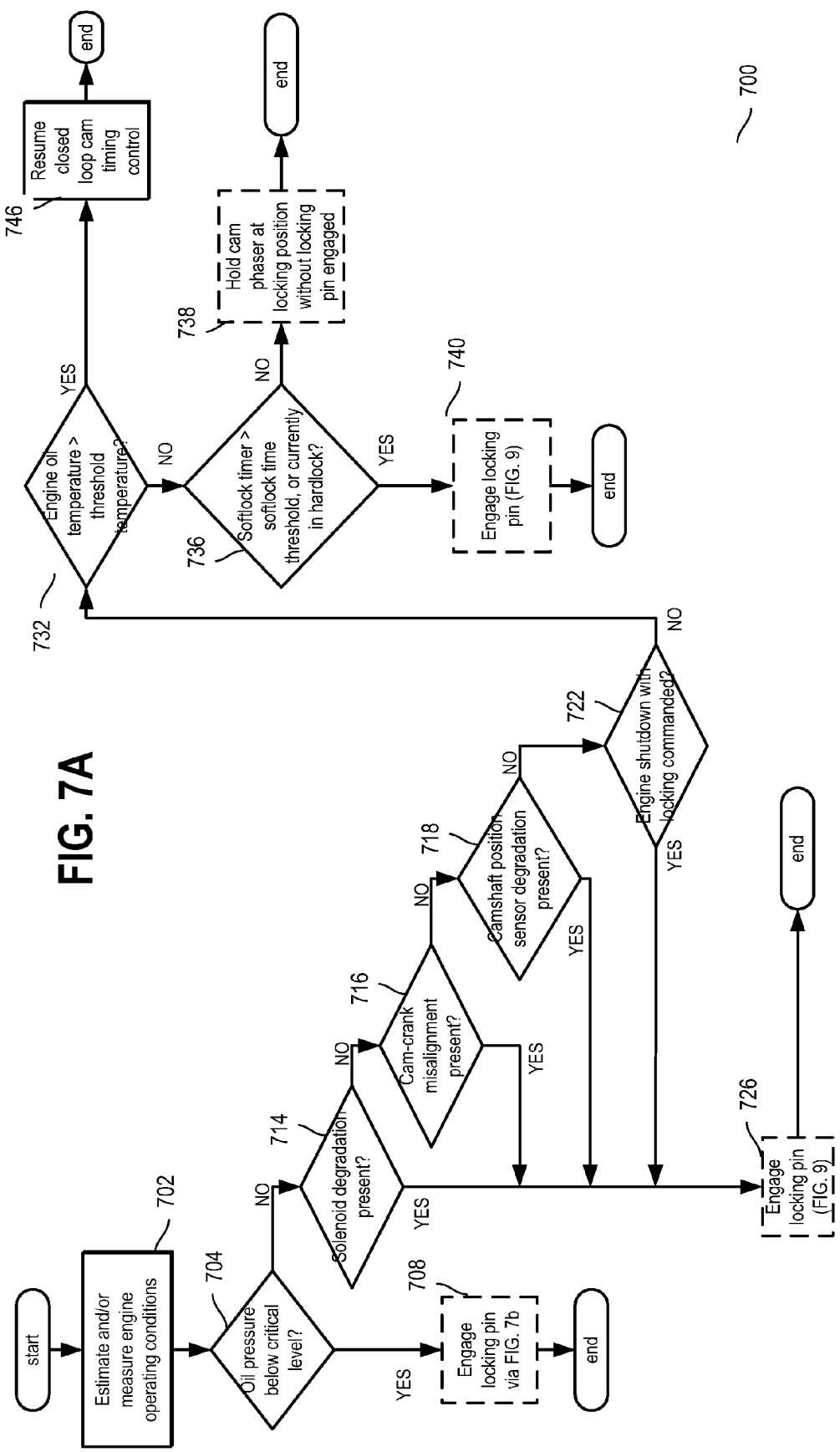
FIGS. 7A-B depict an example method for determining whether to hold a cam phaser in a locking position with a locking pin engaged or disengaged.
Figure 7B:
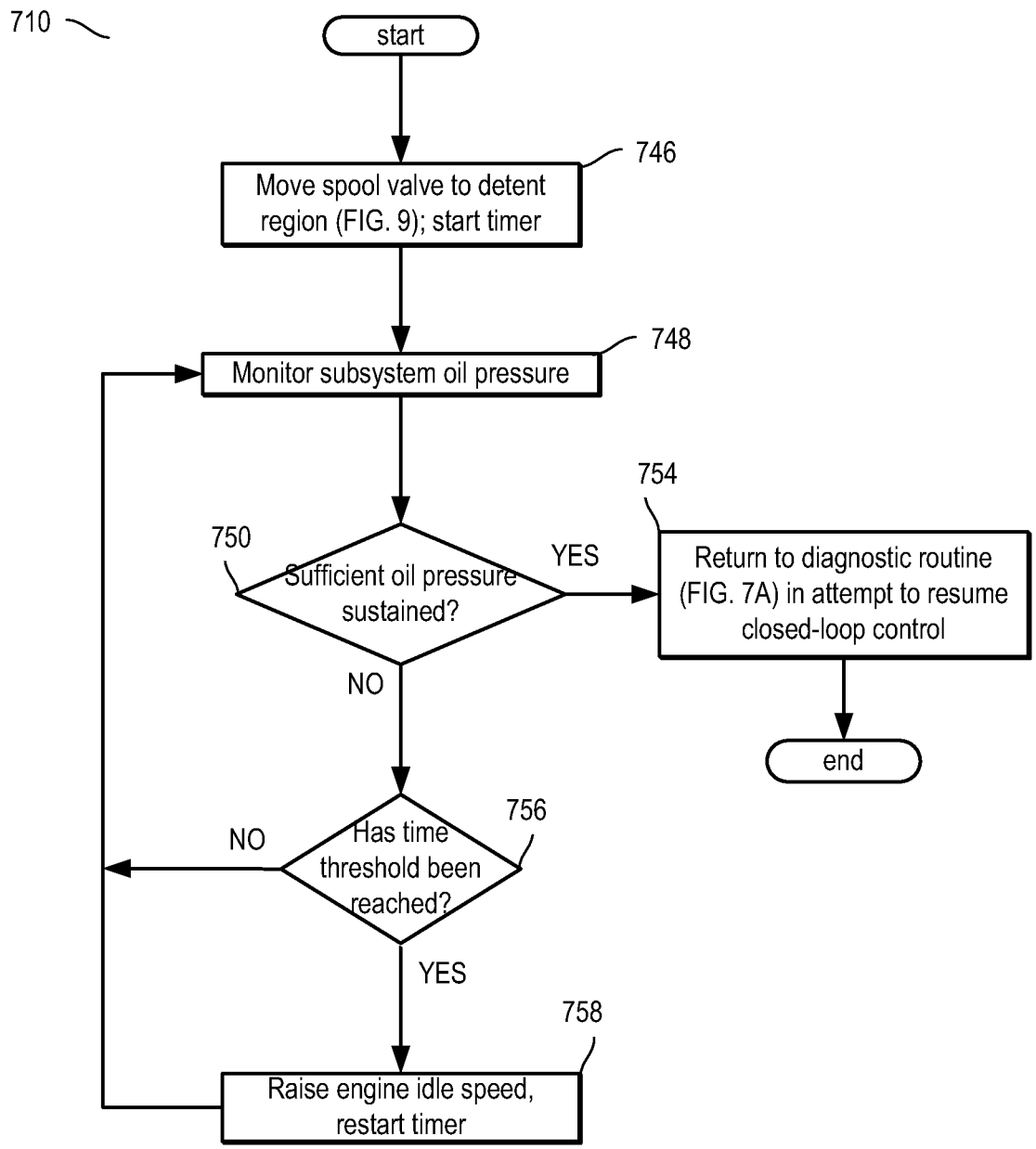

Now turning to FIG. 7A, a method 700 is provided for determining whether to move the cam phaser to the locking position and hold the cam phaser in the locking position with the locking pin engaged, to move the cam phaser to the locking position and hold the cam phaser in the locking position without the locking pin engaged, or to move the phaser under closed loop cam timing control. Moving the cam phaser to the locking position may include first moving the spool valve to one of the advance and retard regions, then moving the spool valve to the null region, as described in method 900. Holding the cam phaser in the locking position without the locking pin engaged may include maintaining the spool valve position in the null region. Holding the cam phaser in the locking position with the locking pin engaged may include moving the spool valve to the detent region to engage the locking pin.

At 702, engine operating conditions are estimated. The estimated conditions may include, for example, engine speed, engine temperature, engine generated oil temperature and pressure. In addition, the output of one or more sensors configured to detect cam position may be read to infer degradation of various hardware components. At 704, the engine generated oil pressure may be compared to a threshold pressure. If the engine generated oil pressure is below the threshold pressure, measures may be taken at 708 to move the cam phaser to the locking position and hold the cam phaser at the locking position with the locking pin engaged. At 706, if the cam phaser had previously been held at the locking position without the locking position engaged, a flag which indicates that the cam phaser is being held in this position without the locking pin engaged may be deactivated in anticipation of activating a flag indicating that the cam phaser is being held in this position with the locking pin engaged. At 708, steps may be taken via method 710 (FIG. 7B) to move the cam phaser to the locking position and engage the locking pin. Under a first condition, such as when engine speed is higher, moving the phaser to the locking position may include prepositioning the cam phaser at a position advanced of the locking position, the particular position based on cam torsion magnitudes and frequencies, such as retard torsion magnitudes and frequencies. In this scenario, the cam phaser may be moved to the locking position by retarded cam torsions. Under a second condition, such as when engine speed is lower, moving the phaser to the locking position may include moving the phaser directly to the locking position without a preposition. In each of the first and second conditions, holding the phaser in the locking position with the locking pin engaged may involve moving the spool valve from the null region to the detent region in order to engage the locking pin. In the first condition, the spool valve may be moved from the null region to the detent region during cam torsion pulses. In the second condition, the spool valve may be moved from the null region to the detent region in between cam torsion pulses. The engine oil pressure may then be monitored and the cam phaser may be moved to a position with the locking pin not engaged when the oil pressure has risen above the threshold pressure, as further described in method 710.

Continuing at 704, if the engine oil pressure is estimated to be above the threshold pressure, various camshaft parameters may be assessed at 714, 716, 718, 722, and the detection of degradation at any of the assessed parameters may cause a common action to be undertaken. Specifically, at 714, it may be determined if there is degradation of the spool valve solenoid based on solenoid electrical circuit diagnostics. At 716, it may be determined if there is a misalignment between the camshaft and the crankshaft, as determined based on cam position diagnostics. At 718, it may be determined if there is degradation of a camshaft position sensor, as determined based on cam position sensor electrical circuit diagnostics, In response to the detection of one or more of degradation of the spool valve solenoid, degradation of the cam position sensor, degradation of the detent circuit, or further if there is identification of inadvertent operation in the no-fly zone, or if a command to shutdown the engine with the phaser at the locking position with the locking pin engaged has been received, the cam phaser may be moved to the locking position and held at the locking position with the locking pin engaged at 726. In addition, a flag indicating that the cam phaser is to be held in this position with the locking pin engaged may be set.

In one example, during a first condition, such as when engine speed is higher, moving the phaser to the locking position may include prepositioning the cam phaser at a position advanced of the locking position, the particular position based on cam torsion magnitudes and frequencies. In this scenario, the cam phaser may be moved to the locking position by retarded cam torsions. Under a second condition, such as when engine speed is lower, moving the phaser to the locking position may include moving the phaser directly to the locking position without a preposition. In each of the first and second conditions, holding the phaser in the locking position with the locking pin engaged may involve moving the spool valve from the null region to the detent region in order to engage the locking pin. In the first condition, the spool valve may be moved from the null region to the detent region during cam torsion pulses. In the second condition, the spool valve may be moved from the null region to the detent region in between cam torsion pulses. Herein the torsion pulses referred to may be retard torsion pulses of the camshaft.

If none of the four conditions 714, 716, 718, and 722 are confirmed, the current temperature of the engine oil may be estimated and compared to a threshold temperature at 732. The threshold temperature may be based on camshaft speed. A low engine temperature may result in high hydraulic oil viscosity, which may result in delayed phaser response under closed loop cam timing control. Delayed phaser response may result in degraded engine performance. In the event that engine oil temperature is determined to be above the threshold temperature, the cam phaser may resume operation under closed loop cam timing control at 746. If the phaser was being held at the locking position, with or without the locking pin engaged, a flag may first be deactivated to indicate that conditions allow for closed loop cam timing control. Operating under closed loop control may include first disengaging the locking pin if the cam phaser was being held in the locking position with the locking pin engaged. If the locking pin was not engaged, operating under closed loop control may include maintaining the locking pin disengaged.

If the engine oil temperature is determined to be below the threshold temperature, the cam phaser may be automatically moved to the locking position and held at the locking position without the locking pin engaged at 734. The phaser may then be held at the locking position without the locking pin engaged for a specified duration. Throughout this duration, engine oil temperature may be monitored. At 736, if engine oil temperature has not risen above the threshold temperature over the duration, the spool valve may be moved to the detent region at 740 to reduce engine generated oil pressure applied on the locking circuit and to engage the locking pin. Alternatively, if no other command for engaging the locking pin is received over the duration, upon elapse of the duration, the spool valve may be automatically moved to the detent region to engage the locking pin and hold the phaser in the locking position with the locking pin engaged. Else, the cam phaser is held in the locking position with the locking pin disengaged at 738. As such, when the locking pin is disengaged, the cam phaser may oscillate around the locking position rather than being held fixedly at the locking position, as may occur when the locking pin is engaged. In this way, if engine oil temperature is determined to be above the threshold temperature at a time soon after the cam phaser was initially moved to the locking position with the locking pin disengaged, the cam phaser may operate under closed loop control without first disengaging the locking pin, thus reducing the response time for the initial phase request.

In one example, method 700 may be executed with an engine system, comprising: an engine cylinder including valves; cams coupled to a camshaft for actuating the valves; a variable cam timing phaser for adjusting valve timing, the phaser actuated using torque from the cams, the phaser including a locking circuit with a locking pin; and a solenoid driven spool valve for adjusting a position of the phaser. The engine system may further comprise a controller with computer readable instructions stored on non-transitory memory for: receiving a command for moving the phaser to a desired position; and in response to the command, moving the spool valve to use cam torque actuated hydraulic pressure separate from engine generated oil pressure to move the phaser to the desired position. The controller may then hold the phaser in the desired position with the locking pin disengaged for a duration, the locking pin held disengaged via the engine generated oil pressure applied on the locking circuit. In response to one of engine generated oil pressure being lower than a threshold pressure and oil temperature being lower than a threshold temperature during the holding, the controller may move the spool valve to a detent region to reduce engine generated oil pressure applied on the locking circuit and engage the locking pin. The controller may include further instructions for, after the duration has elapsed, moving the spool valve to the detent region to engage the locking pin. The controller may also receive a command for unlocking the phaser; and in response to each of engine generated oil pressure being higher than the threshold pressure and oil temperature being higher than the threshold temperature, the controller may then move the spool valve out of the detent region. In comparison, in response to any of engine generated oil pressure being lower than the threshold pressure and oil temperature being lower than the threshold temperature, the controller may maintain the spool valve in the detent region. In this way, the cam phaser response time may be improved by selectively engaging the locking pin under specified conditions, and holding the cam phaser at the locking position without the locking pin engaged under other conditions.

In the instance of low engine generated oil pressure at 704, method 710 (FIG. 7B) may be executed to ensure that an inadvertent engagement of the detent circuit (333 of FIG. 3) does not interfere with the ability of the phasing circuit to control the position of the cam phaser. In particular, the position of a spool valve may be adjusted to the detent region to reduce engine generated oil pressure applied to a locking circuit of the phaser, thus enabling engagement of the locking pin, and disabling the flow of cam torque actuated hydraulic fluid through the phasing circuits. Method 710 may be executed even when cam torque actuated hydraulic oil pressure, separate from engine generated oil pressure, is high enough to move the cam timing phaser via cam torque actuation and a spool valve.

Figure 9:
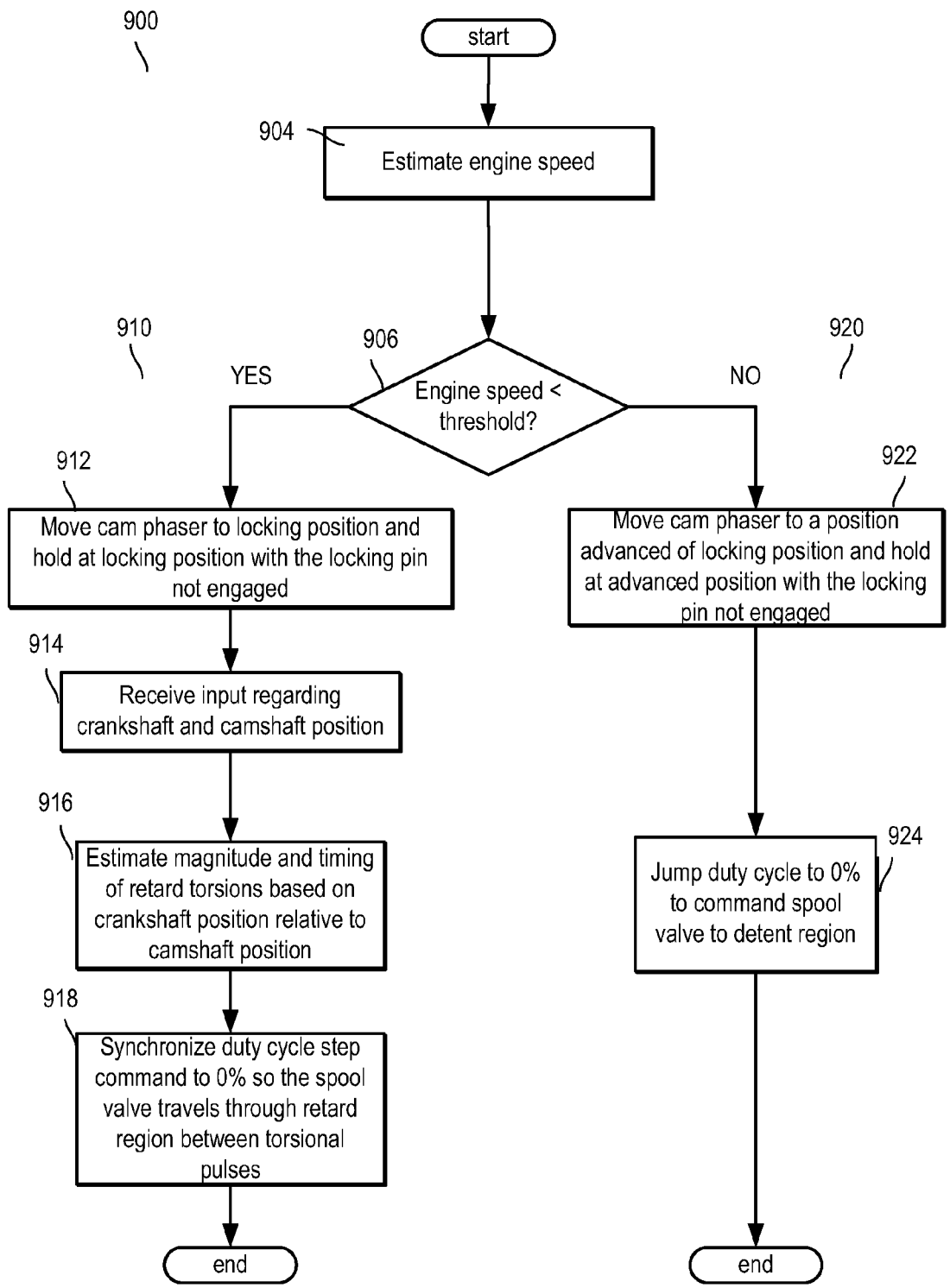
FIG. 9 depicts an example method for locking a cam phaser by selectively moving the spool valve to a detent region during or between camshaft torsional pulses.

At 746 (FIG. 7B), the cam phaser spool valve is moved to the detent region, such as via method 900 of FIG. 9, and a timer is started in order to measure a threshold waiting time. Moving the spool valve to the detent region causes the cam phaser position to be held with the locking pin engaged, thereby "hard-locking" the phaser position. After hard-locking the cam phaser, the engine generated oil pressure in the VCT system is monitored at 748. If the engine generated oil pressure has been above the predetermined oil pressure threshold for a sustained amount of time, method 710 may return to diagnostic routine 700, and routine 710 terminates. If the engine generated oil pressure has not been above the threshold for a sustained period of time, at 756, it may be determined if a threshold amount of time has elapsed since the timer was started at 746. The engine generated oil pressure may be continually monitored until the threshold amount of time has elapsed. Once the threshold amount of time has elapsed, the engine idle speed may be raised at 758 in order to increase the oil pressure of the oil subsystem, thereby raising the engine generated oil pressure acting on the locking pin in the locking circuit above the pressure threshold. Additionally, the timer is reset. In this way, the cam phaser may be held at the locking position with the locking pin engaged until engine generated oil pressure is high enough to maintain enough pressure on the locking circuit to disengage the locking pin. By doing so, inadvertent engagement of the cam phaser's detent circuit is pre-empted.

Figure 7C:
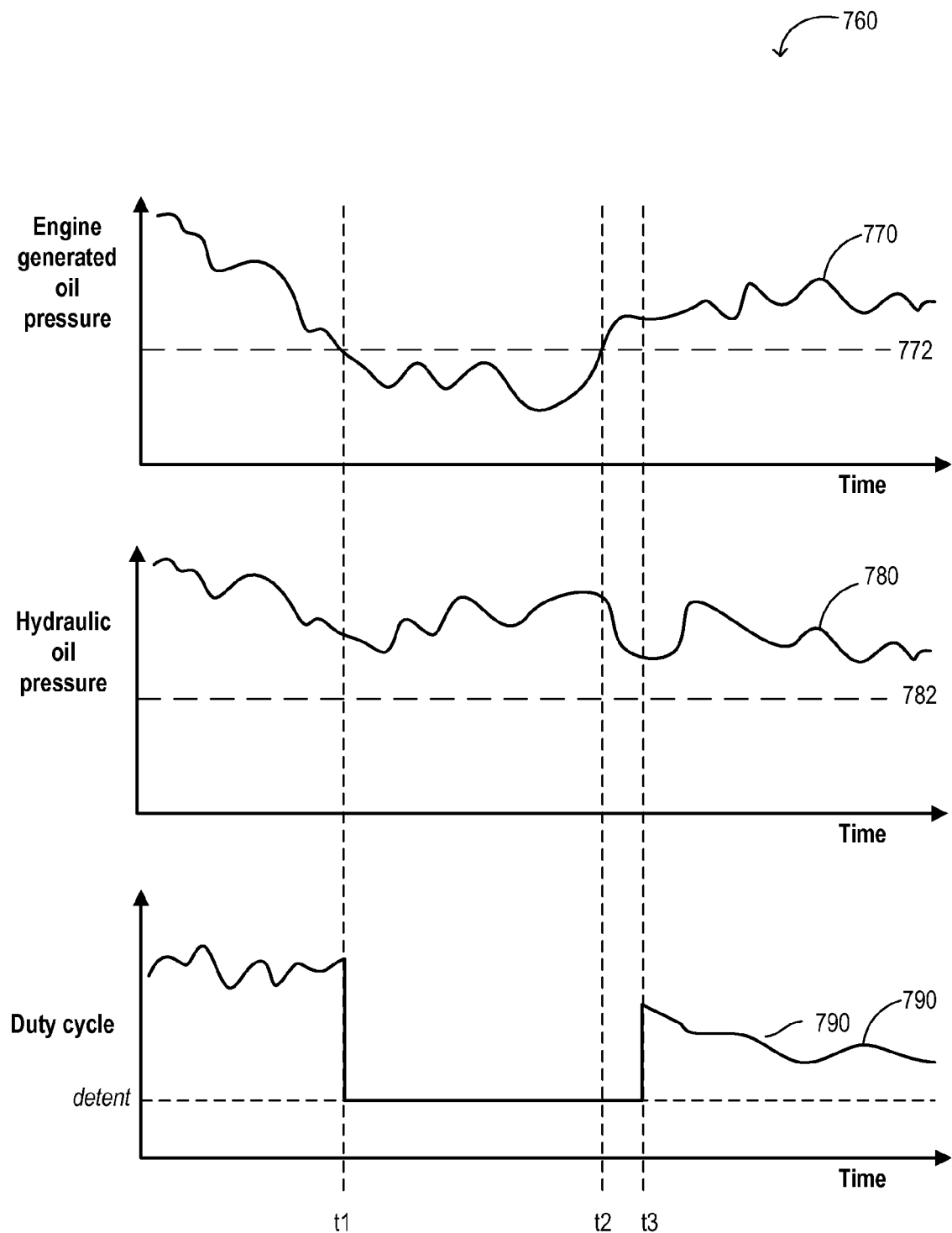
FIG. 7C shows an example of spool valve command adjustment responsive to reduced system oil pressure.

FIG. 7C depicts an example adjustment of a cam phaser position via spool valve adjustments responsive to engine generated oil pressure. Specifically, map 760 depicts engine generated oil pressure at plot 770, cam torque generated oil pressure in the phaser at plot 780, and a solenoid duty cycle of the spool valve at plot 790. All plots are depicted as a function of time, along the x-axis. Before time t1, both cam torque generated hydraulic pressure in the phasing circuit of the phaser and engine speed generated system oil pressure in the detent and locking circuits of a phaser may be above respective thresholds. During this time, cam phaser timing may be adjusted by moving the phaser via cam torque generated hydraulic pressure. As such, cam torque generated hydraulic pressure may be separate from engine generated hydraulic pressure.

At t1, engine generated oil pressure may drop below a threshold pressure 772 while cam torque generated oil pressure in the phaser remains above threshold 782. In response to the drop in engine generated oil pressure, an engine controller may lock the phaser's position by engaging the locking pin. By engaging the locking pin, the phasing circuit may be disabled thus averting competition between the phasing circuit and the detent circuit. Specifically, at t1, the duty cycle of the phaser's spool valve may be jumped from a phasing command to a detent command, in order to command the spool valve to the detent region. By moving the spool valve to the detent region, the cam phaser may be moved to a mid-lock position by flowing hydraulic fluid through the detent circuit lines, rather than the phasing circuit lines. In this example, camshaft torque pulses may remain unused in adjusting camshaft position to the mid-lock position. Further, moving the spool valve to the detent region may further reduce engine generated oil pressure in the locking circuit, enabling engagement of the locking pin.

Between t1 and t2, engine generated oil pressure may remain below the threshold while engine generated oil pressure remains above threshold 782. Accordingly, during this time, the cam phaser may be held at the mid-lock position with the locking pin engaged. At t2, it may be determined that a threshold duration has elapsed since the engagement of the locking pin at t1, with no rise in engine oil pressure. Thus, at t2, to assist in increasing engine oil pressure, an engine idle speed (not shown) may be increased. Between t2 and t3, due to the increase in engine idle speed, engine generated oil pressure rises above threshold pressure 772 and is held above threshold pressure 772 by time t3. In response to the engine generated oil pressure rising and being held above the threshold pressure 772, at t3, the spool valve may be moved out of the detent region, as illustrated by the jump in duty cycle. For example, the spool valve may be moved out of the detent region to one of a null, advance, and retard region. By moving the spool valve out of the detent region, engine generated hydraulic pressure on the locking circuit of the phaser may be increased, thereby disengaging the locking pin and allowing cam phaser movement.

As such, if both engine generated oil pressure and camshaft torque generated oil pressure remain above respective thresholds, holding the cam phaser at the mid-lock position may include first moving the spool valve to one of the advance or retard region in order to move the phaser to the mid-lock position via camshaft torque pulses.

Figure 8A:
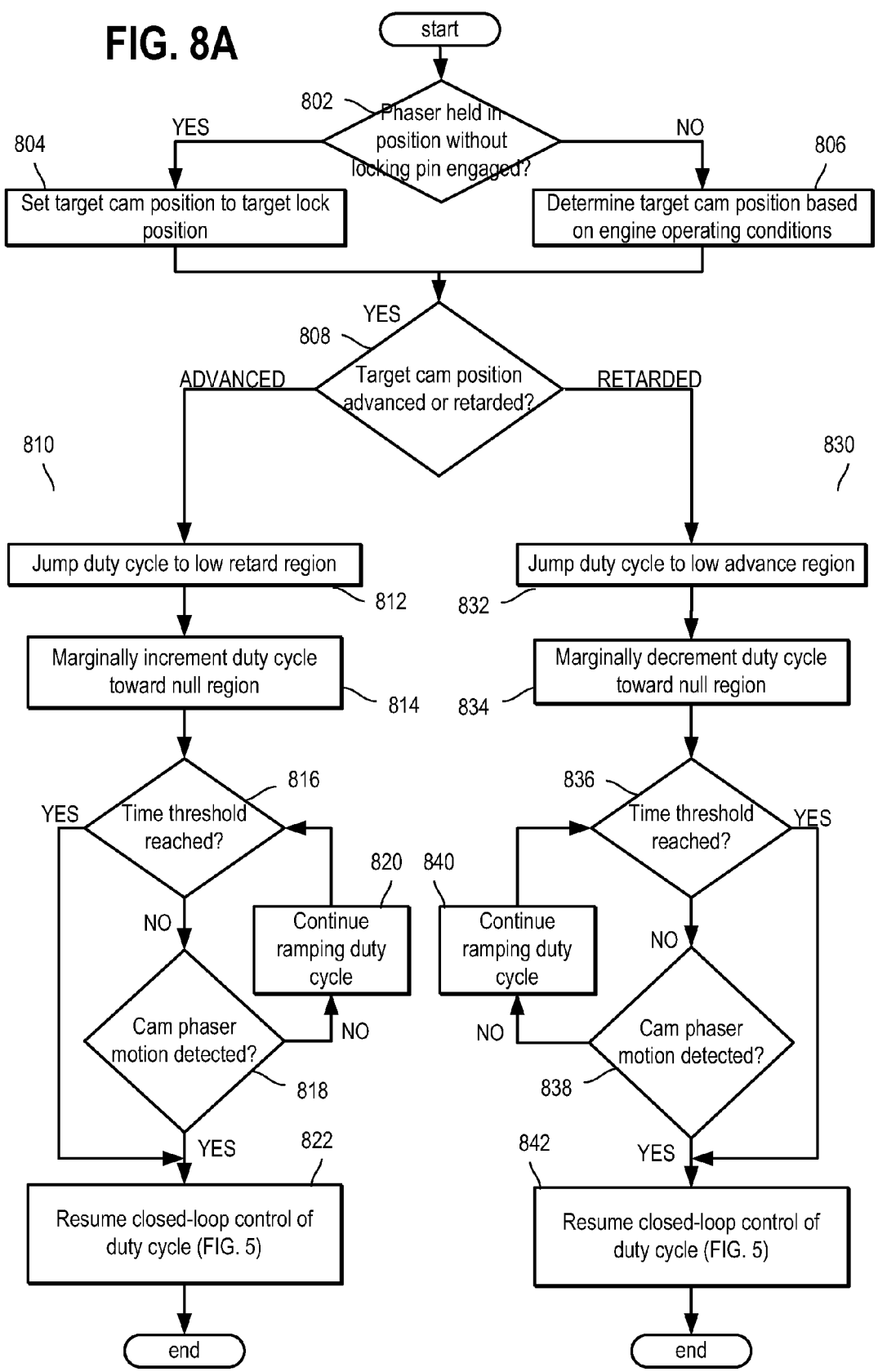
FIG. 8A depicts an example method for selecting how to move the spool valve out of a detent region of the valve in response to a cam phaser unlocking command.
Figure 8B:
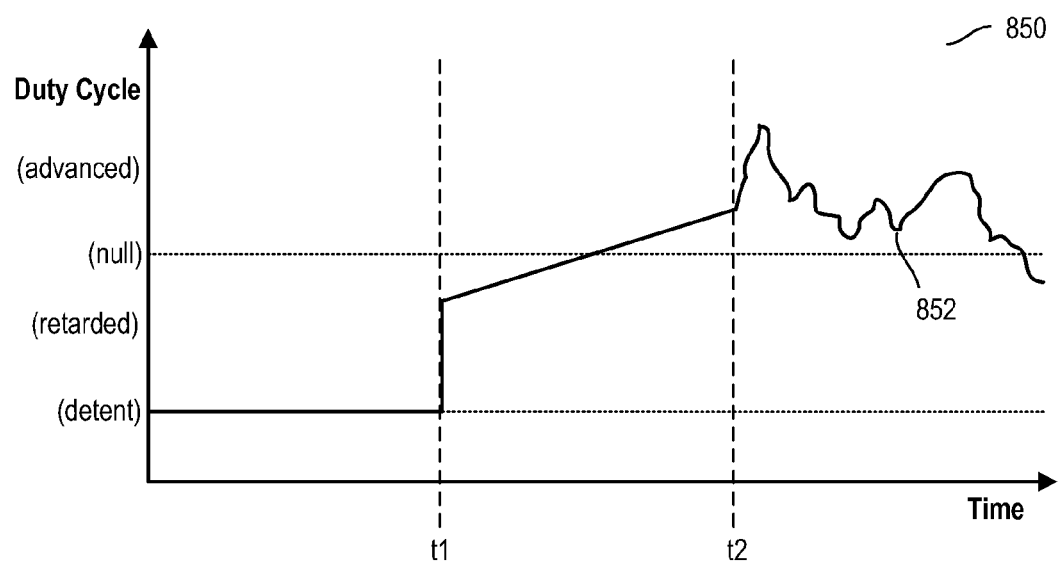
FIG. 8B depicts an example of robustly unlocking the cam phaser using prepositioning adjustments to spool valve position.
Figure 8B:
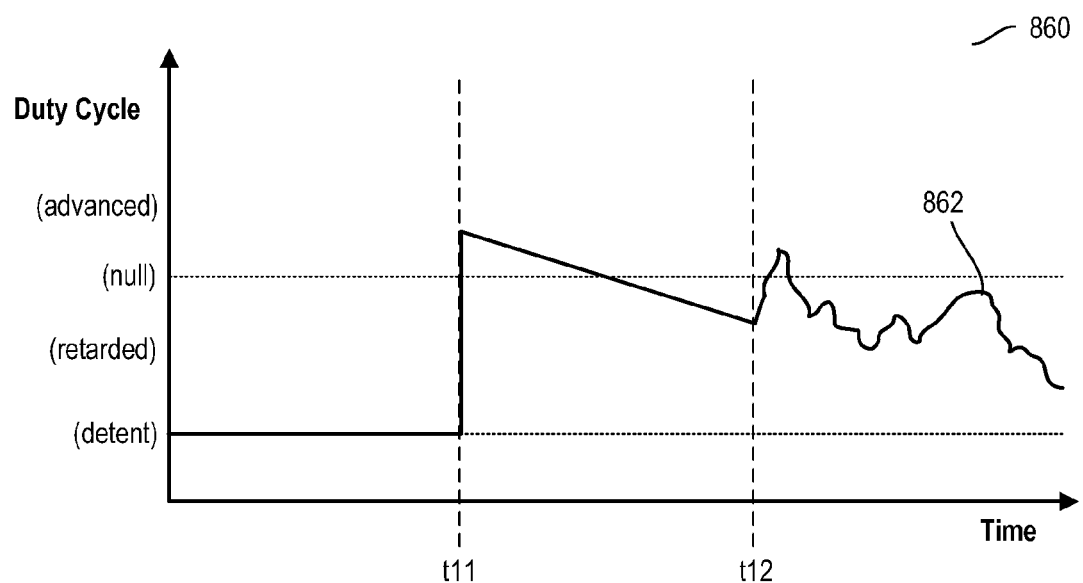

FIG. 8 depicts a method 800 for robustly disengaging the locking pin of the phaser before initiating closed loop control toward a desired unlocked position. In one example, the routine of FIG. 8 may be performed in response to a phasing command that requires disengagement of the locking pin from the recess and adjusting of the position of the cam phaser to a specified unlocked position. The method comprises, in response to a command for moving the phaser from the locking position with the locking pin engaged, jumping the spool valve from the detent region to outside the null region, and ramping the spool valve through the null region while monitoring for phaser movement away from the locked position. Commanding the spool valve to travel slowly through the null region may reduce side-loading on locking pin, which can otherwise occur if the spool valve commands the cam phaser to dramatically adjust its position while the locking pin is still engaged. If the cam phaser is actuated by a torsion while the locking pin is engaged, the resulting torque may be transferred from the cam phaser to the locking pin, alternatively called side-loading. Side loading can lead to substantial errors in phaser positioning by preventing torsions from actuating the cam phaser. Thus slowly ramping through the null region may facilitate and expedite the disengagement of the locking pin, while also reducing mechanical stress on the locking pin. As such, this improves the life of phaser hardware components.

Method 800 may be commanded only during selected conditions that allow for the cam phaser to be in a position other than the locking position with the locking pin engaged.

At 802, it may be determined if the cam phaser is currently held in a position with the locking pin engaged. That is, it may be determined if the phaser is currently hard locked. If the engine controller has requested moving the cam phaser from the locking position with the locking position engaged to a new position and holding the cam phaser at the new position, the holding position may be assigned at 804 to be the target cam position for this phasing routine. It will be appreciated that the holding position may be any value within the range of the cam phaser, including advanced or retarded of the locking position. As an example, the holding position may be a position retarded of zero in the case that a shutdown command is executed and a cold start is expected. In this case, a holding position that is retarded may provide increased engine efficiency during the cold start, a condition in which active phasing may not be enabled. If the engine controller has not requested to move to or hold at a particular position, the target cam phaser position may be determined based on engine operating conditions at 806. It will be appreciated that the target cam position may be any position within the range of the cam phaser, including advanced or retarded of the locking position. For example, if ambient temperature sensor indicates that ambient temperature is very cold (below a lower threshold temperature), then the cams may be advanced at shutdown to achieve compression heating to aid vaporization at the next start. As another example, if ambient conditions indicate a hot temperature (above a higher threshold temperature) then the cams may be retarded at shutdown to reduce the likelihood of engine detonation and achieve a smoother start at the next engine start.

At 808, the target position is compared to the current cam phaser position to determine if a retarding or advancing phasing is required. If the target cam phaser position is advanced of the current cam phaser position, steps 812-822 of sub-routine 810 may be executed to disengage the locking pin from the cam phaser in a controlled manner. If the target cam phaser position is retarded from the current cam phaser position, steps 832-842 of sub-routine 830 may be executed to disengage the locking pin from the cam phaser in a controlled manner. It will be appreciated that the target cam position upon unlock may also be the locking position. In this instance, the duty cycle may be commanded directly to the null region of the spool valve, as further phasing may be unnecessary.

Following sub-routine 810, to advance the phaser position, the spool valve may first be jumped from the detent region to a retarded position near the null region at 812. The spool valve may then be slowly ramped upward through the null region toward the advanced region at 814. Factors such as engine speed, engine oil temperature and others may have an impact on the rate of movement of the phaser, and as such, these factors are considered in determining the rate of change of the spool valve duty cycle. In one example, the rate of ramping may be decreased as one or more of the engine oil pressure and engine oil temperature increases and increased as one or more of the engine speed and a previous unlock response time increases. While the spool valve is ramped through the null region towards the advance region, the cam phaser may be continually monitored for an indication of phaser motion. The ramping may be continued at 820 until a predetermined time threshold is crossed at 816, or until changes in cam phaser position are detected at 818, the cam phaser motion indicating that the locking pin has been disengaged. Once cam phaser motion is detected, the ramping is discontinued, and closed-loop control of the duty cycle is resumed at 822 (via FIG. 5) to direct the cam phaser toward its commanded advanced position. By alternatively resuming the closed loop control of the cam phaser position after the threshold time has elapsed, a maximum phasing request response time may be ensured despite any side-loading of the locking pin upon moving the cam phaser. By moving the spool valve to the advance region by gradually ramping through the null region, the phaser may be more robustly advanced.

Following subroutine 830, to retard the phaser position, the spool valve may first be jumped from the detent region to an advanced position near the null region at 832. The spool valve may then be slowly ramped downward through the null region toward the retarded region at 834. Factors such as engine speed, engine oil temperature and others can have an impact on the rate of movement of the phaser and as such these factors are considered in determining the rate of change of the spool valve duty cycle. In one example, the rate of ramping may be decreased as one or more of the engine oil pressure and engine oil temperature increases and increased as one or more of the engine speed and a previous unlock response time increases. While the spool valve is ramped through the null region towards the retard region, the cam phaser may be continually monitored for an indication of phaser motion. The ramping may be continued at 840 until a predetermined time threshold is crossed at 836, or until changes in cam phaser position are detected at 838, the cam phaser motion indicating that the locking pin has been disengaged. Once cam phaser motion is detected, the ramping is discontinued, and closed-loop control of the duty cycle may be resumed at 832 (via FIG. 5) to direct the cam phaser toward its commanded retarded position. By alternatively resuming the closed loop control of the cam phaser position after the threshold time has elapsed, a maximum phasing request response time may be ensured despite possibly side-loading the locking pin upon moving the cam phaser. By moving the spool valve to the retard region by gradually ramping through the null region, the phaser may be more robustly retarded.

In addition to facilitating removal of the locking pin, routine 800 may also ensure that the initial movement of the cam phaser is toward the commanded position by requiring the spool valve to end up phasing toward the commanded direction at the end of the ramp. Thus, routine 800 may expedite both the process of unlocking the cam phaser and the process of moving the cam phaser toward its commanded position.

FIG. 8B provides illustrations of the execution of subroutines 810 and 830 through respective plots 850 and 860. Both plots depict changes in spool valve duty cycles at 852 and 862, respectively, as functions of time.

Plot 850 illustrates a duty cycle 852 associated with unlocking the cam phaser and positioning it advanced of the mid-lock position, such as described in subroutine 810. Before t1, the duty cycle is adjusted to command the spool valve to the detent region in order to maintain engagement of locking pin 325 in recess 327. At t1, in response to an advance phasing command, the duty cycle is jumped to a point commanding the spool valve to a low-speed retarded mode, as described at 812. Specifically, the spool valve is jumped to a location that is outside the null region, on a retard side of the null region. The duty cycle is then slowly incremented between t1 and t2, through the null region towards the advance region, while monitoring for cam phaser motion. At t2, sudden cam phaser motion in the advance direction may be observed, indicating disengagement of the locking pin. Thus, from t2 onwards, the duty cycle may resume closed-loop control in order to direct the cam phaser to the desired advanced position, as described at 822.

Plot 860 illustrates a duty cycle 862 associated with unlocking the cam phaser and positioning it retarded of the mid-lock position, as described in subroutine 830. Before time t11, the duty cycle may command the spool valve to the detent region in order to maintain engagement of locking pin 325 in recess 327. At t11, in response to a retard phasing command, the duty cycle is jumped to a point commanding the spool valve to a low-speed advanced mode, as described at 832. Specifically, the spool valve is jumped to a location that is outside the null region, on an advance side of the null region. The duty cycle is then slowly ramped upward between t11 and t12, through the null region towards the retard region, while monitoring for cam phaser motion. At t12, sudden cam phaser motion in the retard direction may be observed, indicating disengagement of the locking pin. Thus, from t12 onward, the duty cycle may resume closed-loop control in order to direct the cam phaser to the desired retarded position, as described at 832.

In one example, method 800 may be executed with an engine system, which may comprise an engine cylinder including valves, cams coupled to a camshaft for actuating the valves, a variable cam timing phaser for adjusting valve timing, the phaser actuated using torque from the cams, and a solenoid driven spool valve for adjusting a position of the phaser. The engine system may further comprise a controller with computer readable instructions stored on non-transitory memory for: receiving a command for moving the phaser out of a locked position to a desired unlocked position, and in response to the command, adjusting a duty cycle applied to the solenoid to jump the spool valve from a detent region to a position immediately outside a null region, the position selected based on a commanded direction of moving the phaser. The controller may then ramp the spool valve through the null region while monitoring phaser motion out of the locked position, a direction of the ramping also based on the commanded direction of moving the phaser. For example, when the commanded direction of moving the phaser is a retarded direction, the duty cycle applied to the solenoid is adjusted to jump the spool valve from the detent region to a position within an advance region immediately outside the null region. In comparison, when the commanded direction of moving the phaser is an advanced direction, the duty cycle applied to the solenoid is adjusted to jump the spool valve from the detent region to a position within a retard region immediately outside the null region. Further, a direction of the ramping may also be based on the commanded direction of moving the phaser. Specifically, when the commanded direction of moving the phaser is the retarded direction, the spool valve may be ramped towards the retard region, while when the commanded direction of moving the phaser is the advanced direction, the spool valve may be ramped towards the advance region. The engine system may further include an engine speed sensor, and the controller may include further instructions for estimating an engine speed based on an output of the engine speed sensor, and increasing a rate of ramping the spool valve through the null region as the engine speed increases. The engine controller may further include instructions for, in response to phaser motion out of the locked position, moving the spool valve towards the retard region based on a current phaser position being advanced of the desired unlocked position, and moving the spool valve towards the advance region based on the current phaser position being retarded of the desired unlocked position. In this way, the cam phaser may be moved from the locking position with the locking pin engaged to an unlocked position in such a way that may reduce side loading on the locking pin.

FIG. 9 describes a method 900 for selecting one of sub-routines 910 and 920 for moving the cam phaser to the locking position and engaging the locking pin in response to a locking command. Method 900 may be executed during conditions where closed loop control of the cam phaser is disabled and where engaging the locking pin is desirable to prevent inadvertent movement of the cam phaser. Alternatively, method 900 may be executed in response to a shutdown condition where the desired shutdown position includes the locking position with the locking pin engaged. Sub-routine 910 may move the cam phaser to the locking position and hold the cam phaser at the locking position without the locking pin engaged, and then move the spool valve through the retard region to the detent region in between torsional pulses of the camshaft. In comparison, sub-routine 920 may move the cam phaser to a position advanced of the locking position and hold the cam phaser in this advanced position without the locking pin engaged, and then move the spool valve through the retard region to the detent region during one or more torsional pulses of the camshaft. The final advance position at which the camshaft is held in sub-routine 920 may be based on the initial cam position and estimated cam torsion magnitudes, the degree of advancement increasing with increasing magnitude.

As such, if the spool valve is commanded to move from the normal command region to the detent region, e.g. in order to move the cam phaser to the mid-lock position with locking pin engaged, the spool valve must physically move through the region of operation which commands the maximum retardation speed. Should a retarded cam torsion occur during the time when spool valve is transiently crossing the retarded region, the cam phaser may quickly move a number of degrees in the retarded direction just prior to the spool valve reaching the detent region. Thus, it is highly likely that a cam phaser positioned over the zero phasing locked pin point, in anticipation of the engagement of locking pin, will actually move off in the retarded direction before the hydraulic detent circuit moves it back to the locked pin point.

In another example, when the detent region is adjacent to the advance region, in order to move the cam phaser to the mid-lock position with locking pin engaged, the spool valve must physically move through the region of operation which commands the maximum advancement speed. Should an advanced cam torsion occur during the time when spool valve is transiently crossing the advanced region, the cam phaser may quickly move a number of degrees in the advanced direction just prior to the spool valve reaching the detent region. Thus, it is highly likely that a cam phaser positioned over the zero phasing locked pin point, in anticipation of the engagement of locking pin, will actually move off in the advanced direction before the hydraulic detent circuit moves it back to the locked pin point.

Sub-routine 910 may be selected under a first set of operating conditions, such as when the engine speed is lower. In comparison, sub-routine 920 may be executed under a second, different set of operating conditions, such as when the engine speed is higher. Further, the engine controller may transition between the sub-routines 910, 920 responsive to changes in engine speed. For instance, the controller may transition from sub-routine 910 to sub-routine 920 in response to an increase in engine speed. In another instance, the controller may transition from sub-routine 920 to sub-routine 910 in response to a decrease in engine speed.

Method 900 includes, at 904, estimating an engine speed. In one example, the engine speed may be estimated based on the output of an engine speed sensor. At 906, the engine speed may be compared to a threshold to determine if there is lower or higher engine speed. Based on the engine speed, a selection may be made whether to move the cam phaser to the locking position and engage the locking pin via sub-routine 910 or sub-routine 920. While routine 900 differentiates between executing sub-routines 910 and 920 based on engine speed, 920 may be executed at any engine speed. In alternate example, a choice may be made between sub-routines 910 and 920 on other criteria such as engine load. In this alternate example, either of 910 or 920 may be a default method, and the other method may be executed only under certain conditions, such as speed and load above/below respective thresholds concurrently.

In particular, if the engine speed is determined to be lower than the threshold, sub-routine 910 may be executed. A low engine speed is associated with torsion pulses that are strong relative to pulses at high rotational speeds. Additionally, the pulses may be spaced further apart in time. Because sub-routine 910 is based on timing the movement of the spool valve to avoid inadvertent retardation pulses, it may be a more appropriate method in the low-RPM regime. Additionally, the strong torsion pulses in the low-RPM regime may make an appropriate prepositioning the cam phaser more difficult, as there may be a larger variation between the magnitudes of torsion pulses in this regime. Thus, executing method 920 may prove to be more difficult when the engine speed is lower.

If the rotational speed of the camshaft is determined to be higher than the threshold, sub-routine 920 may be executed. Because sub-routine 920 is based on timing the movement of the spool valve during torsion pulses, it may be advantageously used in the high-RPM regime where there are more opportunities for shifting due to frequent pulses. Additionally, the low strength of the torsion pulses outside of the low-RPM regime may make prepositioning the cam phaser easier due to a smaller variation between the magnitudes of torsion pulses in this region.

Turning to sub-routine 910, it describes a method which, in response to a desired cam timing at the locking position with the locking pin engaged, may move the spool valve to move the cam phaser to the locking position, hold the phaser at the locking position without the locking pin engaged, and then move the spool valve to the detent region from a position away from the detent region in between torsional pulses of a camshaft.

At 912, the sub-routine 910 includes, before moving the spool valve to the detent region to lock the phaser, moving the spool valve to move the cam phaser to the locking position. This may include moving the spool valve to a retard region when the cam phaser is positioned advanced of the locking position, or moving the spool valve to an advance region when the cam phaser is positioned retarded of the locking position.

The controller may control the motion of the spool valve in such a way that the spool valve is moved to the detent region from a position away from the detent region in between torsional pulses of the camshaft. The position away from the detent region may be one of the null region, advance region, or retard region of the spool valve. As discussed at 912, before moving to the detent region, the spool valve may be commanded to move the cam phaser to the locking position without engaging the locking pin using cam torque. In one example, the phaser may be retarded of the locking position, in which case the spool valve may be moved to the advance region until the phaser is in the locking position. In another example, the phaser may be advanced of the locking position, in which case the spool valve may be moved to the retard region until the phaser is in the locking position. The cam phaser may then be held in the locking position without the locking pin engaged by moving the spool valve to the null region. Moving the spool valve to the null region may occur before a torsional pulse, thus averting further movement of the cam phaser. The spool valve may be held in the null region until 918.

Figure 10A:
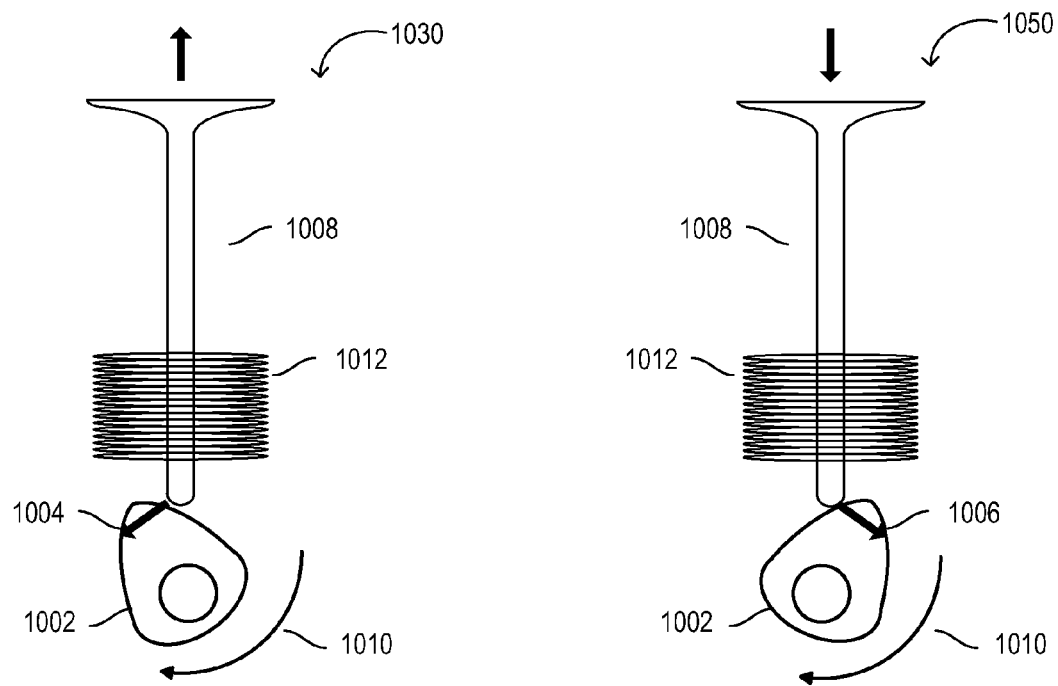
FIGS. 10A-B depict the effect of camshaft torsional pulses on phaser positioning.
Figure 10B:
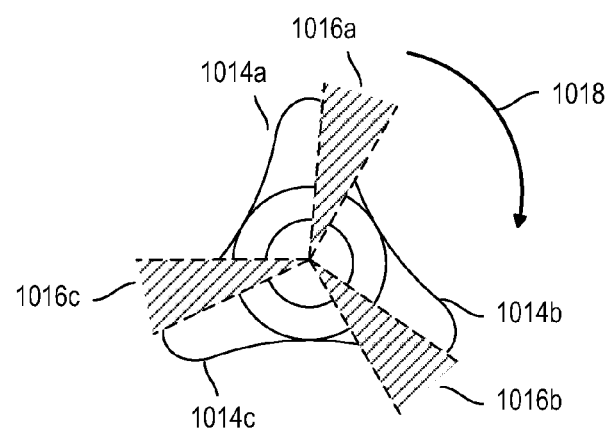

At 914 the controller may receive input regarding crankshaft and camshaft position. At 916, the controller may estimate a timing and magnitude of retard torsional occurrence based on the crankshaft position relative to the crankshaft position. For example, on a given engine, a given camshaft may have a fixed number of cam lobes as shown in FIG. 10B. As the camshaft rotates, the lobes may be subjugated to torsional forces originating from deflection of the valve spring, through the valvestem, or through other linkages coupled to the valvestem as shown in FIG. 10A. These forces may occur at known intervals for a given engine as determined by the angular position of the camshaft lobes. For a given engine and given camshaft, the angular position of the camshaft lobes may be some known, fixed offset from the sensing teeth of the VCT phaser. The angular position of the sensing teeth may be detected by the cam position sensor. The angular position of the occurrence of torsional forces may be determined by sensing the angular position of the sensing teeth of the VCT phaser and applying the known fixed offset between the sensing teeth and the camshaft lobes. Based on the time between pulses and delays associated with solenoid signal transmission and spool valve travel time, the step from the closed loop control region of the duty cycle to the detent region of the duty cycle may be executed at 918 in such a way that the spool valve travels through the retard region during a period of time between retarded torsional pulses. The spool valve may have been in one of the null, advance, or retard regions before moving to the detent region. For example, the spool valve may be held in the null region until during one torsional pulse and moved through the retard region to the detent region after the first pulse has elapsed and before a second torsional pulse starts. After the spool valve has reached the detent region, engagement of the locking pin may be enabled, and the phaser may be held in the locking position by the locking pin.

Continuing at method 920, in response to a desired cam timing at the locking position with the locking pin engaged, the method may move the spool valve to move the cam phaser to a position advanced of the locking position, hold the phaser at the position advanced of the locking position, and then move the spool valve to the detent region while a cam torsional pulse occurs. In one example, the cam torsional pulses may be retarded, and the associated torque may actuate cam phaser movement from the held advanced position to the locking position. At 922, the cam phaser may be moved to a position advanced of the locking position, with the locking pin not engaged, by moving the spool valve to the appropriate region. The advance position to which the cam phaser is moved may depend on current phaser position, estimated torsion magnitudes, engine speed, and oil temperature. For example, if the current phaser position is retarded of the locking position, the cam phaser may be moved to a first position advanced of the locking position, and if the phaser position is currently advanced of the locking position, the cam phaser may be moved from the current advanced position to a second advanced position. The second advanced position may be more advanced or less advanced relative to the current advanced position, and it may be more advanced or less advanced relative to the first advanced position. The spool valve may be moved to the advance region when current cam timing is retarded of the first or second advanced position, and may be moved to the retard region when the current cam timing is advanced of the second advanced position. The cam phaser may be held in one of the first or second positions advanced of the locking position with the locking pin disengaged by moving the spool valve to the null region. The spool valve may be held in the null region before a retarded torsional pulse, and may be moved through the retard region to the detent region during the retarded torsional pulse. After the spool valve has reached the detent region, engagement of the locking pin may be enabled, and the phaser may be held in the locking position by the locking pin. In this way, inadvertent excessive retardation may be avoided when locking a phaser by prepositioning the cam phaser at an advanced position.

FIGS. 10A-B depict the effect of cam torsionals. Specifically, FIG. 10A depicts a single-lobe cam 1002 in two different states 1030, 1050. On the left, at state 1030, cam 1002 is shown subjected to retarded cam torsion 1004, while on the right, at state 1050, the cam is shown subjected to advanced cam torsion 1006. At state 1030, as the clockwise rotational motion 1010 of cam 1002 pushes valve 1008 upward, retarded cam torsion 1004 is imparted onto the cam by the resisting force of spring 1010. Similarly, at state 1050, after the angular position of cam 1002 passes the point of maximum spring compression, spring 1010 imparts advanced cam torsion 1006 upon the cam as the spring decompresses and valve 1008 moves downward.

FIG. 10B depicts a cam with three lobes 1014a-c and three retarded cam torsion regions 1016a-c. The retarded cam torsion regions 1016a-c show the positions in angular space where the cam will experience retarded cam torsion from pushing a valve upward through a 720-degree rotational cycle of the crankshaft (not pictured). By tracking the angular position of the crankshaft and synchronizing the retarded torsion regions to regions in the period of a crankshaft rotation 1018, the phasing system can predict at what points in time these retarded cam torsion regions will be crossed. This information can then be used to accurately time the movement of spool valve through the retarded region such that spool valve motion occurs when the cam is not in a retarded cam torsion region.

Figure 11:
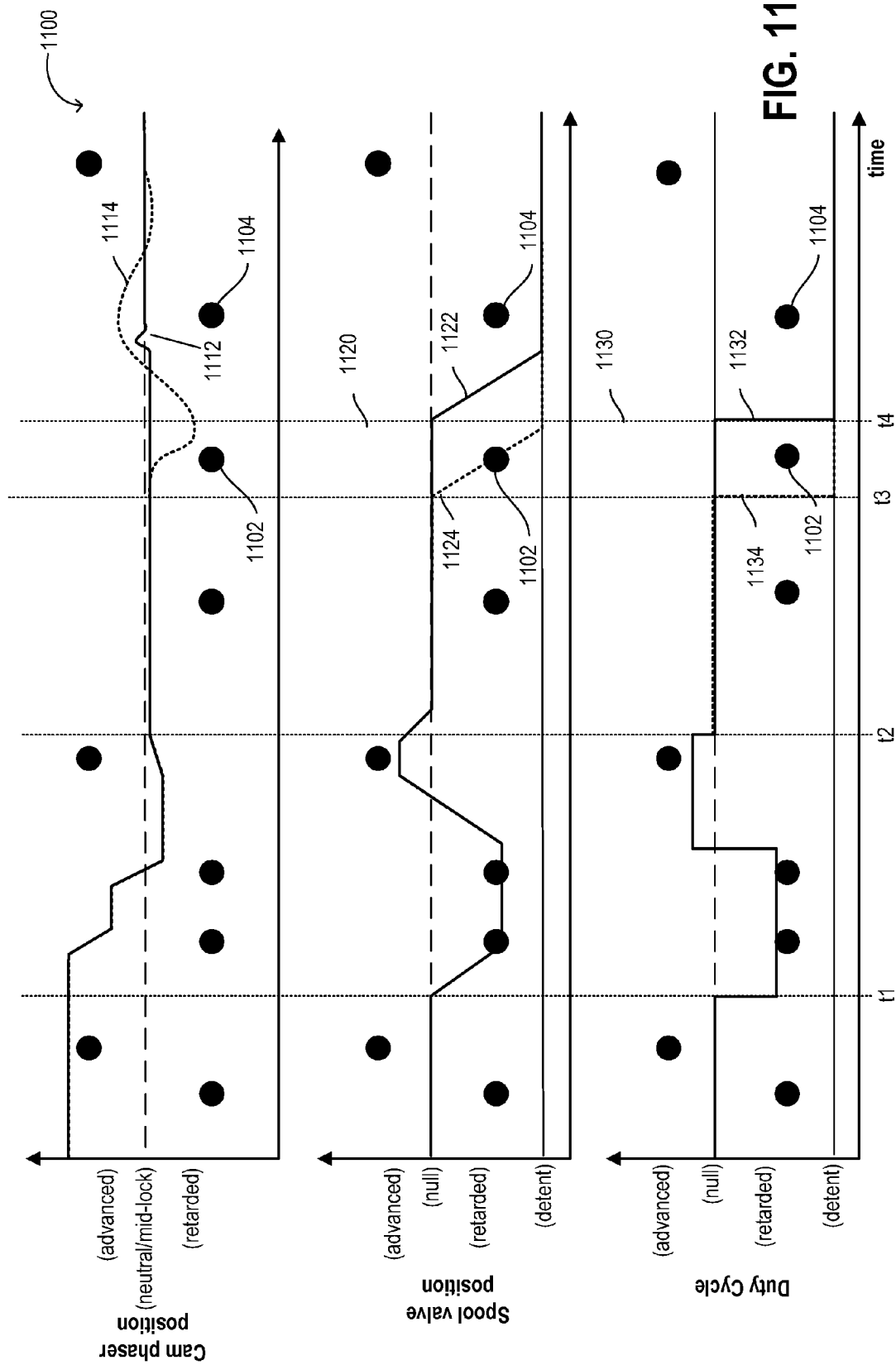
FIGS. 11-12 depict prophetic examples of spool valve motion to a detent region during or between camshaft retard torsional pulses.

FIG. 11 provides a prophetic example of moving the spool valve to the detent region in between retard torsional pulses. Specifically. FIG. 11 includes three plots 1100, 1120, and 1130 which respectively describe cam phaser position, spool valve position, and solenoid duty cycle as functions of time. Curves 1112, 1122, and 1132 are illustrative of a duty cycle command to the detent region timed such that spool valve 311 travels through the retard region in between two retarded torsion pulses 1102 and 1104. Curves 1114, 1124, and 1134 are illustrative of a duty cycle command to the detent region timed such that a retarded torsion pulse occurs as spool valve 311 travels through the retard region toward the detent region. Torsion pulses are denoted by black circles, such as 1102 and 1104, and occur at various points in time. It may be appreciated that torsion pulses may actuate the cam phaser in either the advanced or retarded directions, as denoted by the position of the pulse relative to the "zero" on the independent axis of each plot. It may also be appreciated that each torsion pulse has an associated magnitude and duration. In the present example, each torsion pulse is provided the same magnitude and duration for simplicity.

In the example depicted at plot 1100, cam phaser position 1112 may be a position advanced of the mid-lock position when a request to move to the mid-lock position with the locking pin engaged is received before t1. Accordingly, between t1 and t2, the phaser may be moved from advanced of the locking position to the locking position, and then held in the locking position with the locking pin engaged by moving the spool valve through the retard region to the detent region in between torsional pulses of the camshaft. It will be appreciated that cam phaser position 1112 may be anywhere in its range when the request to move to the mid-lock position with the locking pin engaged is received. In another example, the cam phaser position may initially be in a retarded phase. In such an example, the phaser may be moved from retarded of the locking position to the locking position by moving the spool valve to the advance region, and holding the phaser in the locking position with the locking pin engaged by moving the spool valve through the retard region to the detent region in between torsional pulses of the camshaft. In another representation, the cam phaser position may initially be at the mid-lock position without the locking pin engaged. In such a representation, the phaser may be held in the locking position without the locking pin engaged, and thereafter the locking pin may be engaged by moving the spool valve through the retard region to the detent region in between torsional pulses of the camshaft.

In each case, the cam phaser may be adjusted toward the locking position without the locking pin engaged by moving the spool valve in the appropriate manner. In the present example, between after t2, the cam phaser position is held in its initial position as a consequence of the spool valve's position in the null region. Upon the request to move to the locking position with the locking pin engaged, the cam phaser may first be commanded toward the locking position without the locking pin engaged. In the present example, the duty cycle commands spool valve to the retard region, and upon the event of retarded torsion pulses, the cam phaser position may move from its initial advanced position toward the mid-lock position. In the present example, a retarded torsion pulse moved the cam phaser position to a position retarded of the mid-lock position, and as a recourse the spool valve was commanded to the advance region in order to further steer the cam phaser position toward the mid-lock position. In another example, the spool valve may be held in the retard region until the cam phaser reaches the locking position via retarded torsional pulses, the cam phaser reaching the locking position from an advanced position without first passing the locking position. After the cam phaser position has reached the mid-lock position within a specified tolerance, the spool valve may be commanded to the null region before another torsional pulse to avert further movement of the cam phaser.

Referring to curves 1112, 1122, and 1132, at t4, duty cycle 1132 is jumped to the detent region after retarded torsion pulse 1102 has occurred but before retarded torsion pulse 1104 has occurred. Accordingly, spool valve position 1122 is held in the null position during pulse 1102, and moves to the detent region from the null region between retarded torsion pulses 1102 and 1104. Thus, inadvertent movement of cam phaser position 1112 in the retarded direction is averted. After the spool valve has reached the detent region, the detent circuit may be engaged to hydraulically move cam phaser position to the locking position. Further, the locking circuit may be engaged, thus enabling the engagement of the locking pin to lock the cam phaser at the locking position. Because torsional pulses were avoided, the phaser position may either be at or very close to the locking position when the spool valve reaches the detent region, which may allow the engagement of the locking pin to occur relatively quickly. In this way, the amount of time required to move the cam phaser to the locking position and engage the locking pin may be more predictable because torsional pulses are avoided.

Referring to curves 1114, 1124, and 1134, if the duty cycle 1134 was jumped to the detent region at t3, before retarded torsion pulse 1102 occurred, spool valve position 1122 may not be held in the null position during pulse 1102. Instead, the spool valve position may move to the detent region from the null region during (and due to) pulse 1102. Consequently, inadvertent movement of cam phaser position 1112 in the retarded direction occurs. After the spool valve has reached the detent region, the detent circuit may be engaged to hydraulically move cam phaser position to the locking position. Further, the locking circuit may be engaged, which may enable the engagement of the locking pin to lock the phaser in the locking position. Because torsional pulses were not avoided, the amount of time required to move the phaser to the locking position may be larger when the duty cycle is jumped at t3 as compared to t4 (see fluctuation at curve 1112) because of the larger initial displacement of the cam phaser from the mid-lock position.

In one example, an engine system may comprise an engine cylinder with valves and a crankshaft. The engine system may further comprise cams which may be coupled to a camshaft for actuating the valves, a variable cam timing phaser for adjusting valve timing, the phaser actuated using torque from the cams, a spool valve for adjusting a position of the phaser, and a controller with computer readable instructions stored on non-transitory memory. The controller may be configured with code for estimating a timing of retard torsional pulses of the camshaft based on camshaft position relative to crankshaft position, advancing the phaser to a locking position and holding the phaser in the locking position without engaging a locking pin by moving the spool valve in between the torsional pulses while holding the spool valve during the torsional pulses, and after advancing the phaser to the locking position, engaging the locking pin. Specifically, the spool valve may be coupled to a solenoid, and moving the spool valve may include adjusting a duty cycle commanded to the solenoid. Further, advancing the phaser to the locking position by moving the spool valve may include first moving the spool valve to an advance region until the phaser moves to the locking position. Then, when the phaser is in the locking position, the controller may move the spool valve to a null region before a first torsional pulse, hold the spool valve in the null region during the first torsional pulse, and then move the spool valve from the null region to the detent region before a second torsional pulse following the first torsional pulse. The controller may include further instructions for disengaging the locking pin before moving the spool valve out of the detent region to one of the advance and retard region to vary cam timing.

Figure 12:
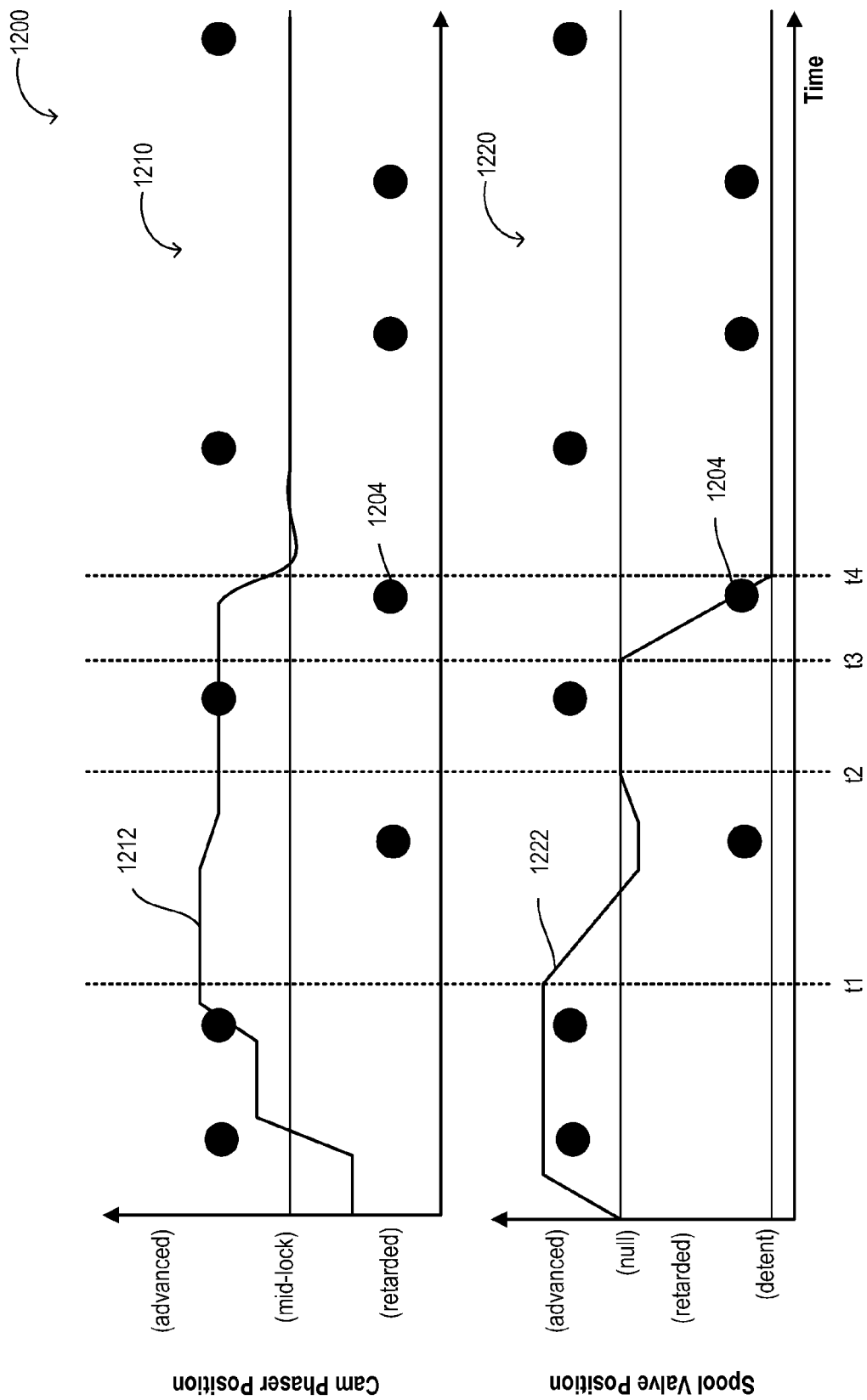

FIG. 12 provides a prophetic example 1200 of moving the spool valve to the detent region during and using torsional pulses. Plots 1210 and 1220 respectively describe cam phaser position 1212 and spool valve position 1222 as functions of time.

Initially, before t1, the cam phaser position may be anywhere within its range without the locking pin engaged. Further, the spool valve may be anywhere within the closed loop phasing region of operation. In the present example, the cam phaser is initially at a retarded position, and the spool valve position is operating in the null region. The cam phaser position is then commanded to a locked advanced phase position at t1, and the spool valve moves accordingly. Specifically, the spool valve first moves to the advanced region and a number of advanced torsion pulses (herein, two) actuate the cam phaser through the mid-lock position to an advanced position. Between t1 and t2, the spool valve then moves to a low retard position to slightly retard the position of the cam phaser, and after one retarded torsion pulse, the cam phaser reaches the desired advanced phase position.

To maintain the cam phaser in this position, the spool valve is moved to the null region at t2. The spool valve may then receive a command to travel toward the detent region in order to engage the detent circuit at time t3, the spool valve motion moving the cam phaser position to the mid-lock position and engaging the locking pin. During the path of spool valve through the high retard region after t3, retarded torsion pulse 1204 occurs, and actuates the cam phaser to a retarded position close to the mid-lock position. It will be appreciated that in alternate iterations of the given routine, retarded torsion pulses may be absent while the spool valve travels through the retard region. In another example, retarded torsion pulses may actuate the cam phaser to a position still advanced of the mid-lock position. In a further example, retarded torsion pulses may actuate the cam phaser to a position significantly past the mid-lock position. In the case of retarded torsion pulses, multiple retarded torsion pulse may occur while the spool valve is in the high retard region. The spool valve enters the detent region at t4, after retarded cam torsion pulse 1204 has occurred, at which point the detent hydraulic circuit takes control of cam phaser position 1212 and directs it toward the neutral or mid-lock position and engages the locking pin.

In this way, retarded torsions may be utilized to move the cam phaser more precisely toward the mid-lock position rather than away from the mid-lock position during a request to move to the mid-lock position and engage the locking pin.

To avoid inadvertent operation in the detent region, it is desirable to determine the upper boundary of the detent region, that is to say the solenoid duty cycle that aligns with the upper boundary of the detent region. This may be referred to herein as the "max detent duty cycle". This duty cycle is determined by slowly increasing duty cycle and observing actual cam position. The duty cycle at which the actual cam position first moves from the mid-lock position, indicating pin unlocking, is the max detent duty cycle.

Figure 13:
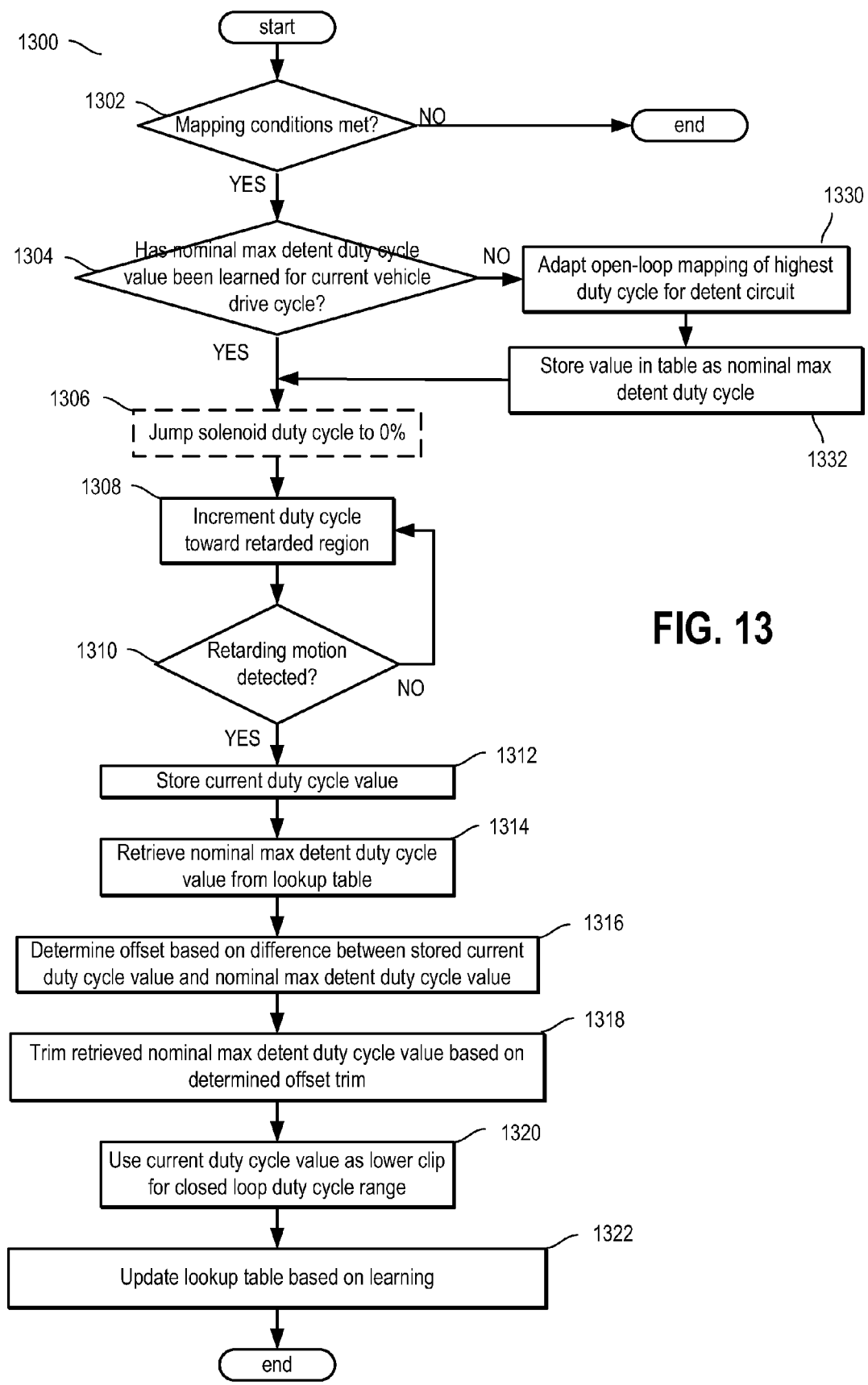
FIG. 13 depicts a method for opportunistically mapping a no fly zone of the VCT phaser spool valve.

FIG. 13 depicts a routine 1300 for adaptively learning the region of solenoid duty cycle values that command the spool valve to a region where the detent circuit 333 and the closed loop phasing circuit are both engaged. The adapted boundaries of this region may then be applied when commanding subsequent spool valve motion. This region may hereby be referred to as the "no-fly zone" or "a transitional region" between the detent region and the retard region of the spool valve. In another example, when the detent region is adjacent to the advance region, the no-fly zone may be between the detent region and the advance region of the spool valve. As such, accurate mapping of this region enables erratic phaser motion to be reduced. In particular, if both the phasing and detent circuits are engaged, they may compete for control of cam phaser position, and the phaser may consequently move in an erratic and unpredictable manner. Determining the borders of the transitional region may be based on phaser movement away from the locking position with the locking pin engaged, and this movement may be a result of a ramping of the solenoid duty cycle.

At 1302, the routine includes determining engine operating conditions to confirm that conditions are appropriate for mapping the no fly zone. For example, when the engine is still a green engine, after a module reflash, or after a battery disconnect, mapping the no fly zone may be appropriate because the borders of the region may not yet be well learned. In another example, a threshold distance or duration may have elapsed since the last mapping, and mapping the no fly zone may be advantageous for reducing possible drift. In still another example, deceleration fuel shut off may be active and the engine may not be firing, and mapping the no fly zone may be enabled due to the possibility that optimum scheduling may not request a locked cam phasing sequence for the remainder of the drive cycle if the cam phaser was enabled during conditions not ideal for learning the no fly zone when last leaving the locking position. In another example, a request to move the spool valve to the advance region may not be expected for a predetermined amount of time, and mapping the no fly zone may be appropriate. In still another example, a request to hold the cam phaser in the locking position with the locking pin engaged for longer than a second threshold duration may occur, in which case mapping the no fly zone may be appropriate. In yet another example, inadvertent operation of the spool valve in the no fly zone may have been recently detected, and mapping the no fly zone may be required to reduce such inadvertent motion. The inadvertent operation of the spool valve in the no fly zone may have been detected based on phaser position error being higher than a specified threshold. If mapping conditions are not met at 1302, the routine terminates. If mapping conditions are met at 1302, the engine may enter a special learning mode to map the transitional region, the transitional region mapped based on phaser motion out of the locked position relative to spool valve motion through the transitional region.

At 1304, upon initiating the learning mode, the engine controller may check whether a nominal maximum detent duty cycle value has been learned during the current vehicle drive cycle. The nominal maximum detent duty cycle value may be the most recent estimate of the largest duty cycle value at which the detent circuit is engaged. The largest duty cycle value at which the detent circuit is engaged may correspond directly to the duty cycle command in the detent region for which the phasing rate via the detent circuit is at a minimum. Above the nominal maximum detent duty cycle value, only the closed loop phasing circuit may be engaged. If this value has not yet been learned during the current vehicle drive cycle, an open-loop mapping may be created at 1330 to determine this duty cycle value, and this value may be stored in a lookup table at 1332 for later use. It will be appreciated that in one embodiment of routine 1300, a fixed nominal maximum detent duty cycle may be used during the adaptive learning of the no fly zone boundaries, while in an alternate embodiment of routine 1300, a previous trim of the fixed nominal max detent duty cycle may be updated during the adaptive learning of the no fly zone boundaries.

If the nominal maximum detent duty cycle has been learned, at 1306, the solenoid duty cycle may be jumped to a position well within the detent region, for example to 0%. The value to which the duty cycle is jumped to may be based on the current border between the transitional region and retard region, which may be learned from open loop mapping 1330. The duty cycle value may then be slowly incremented from the detent region, through the transitional region, toward the retard region at a constant positive rate at 1308. It will be appreciated that in an alternate example, the detent region may be adjacent to the advance region rather than the retard region, and the duty cycle value may then be slowly incremented from the detent region, through the transitional region, toward the retard region at a constant positive rate. This incrementing may continue until phaser movement away from the locking position is detected at 1310. Phaser movement away from the locking position may indicate that the spool valve is no longer operating in the detent region, as the phaser is no longer held in the locking position with the locking pin engaged. This phaser movement may be in the retarded direction if the retard region is adjacent to the advance region, or in the advanced direction if the advance region is adjacent to the detent region.

When phaser movement away from the locked position is detected, the incrementing of the duty cycle may be ended. The duty cycle value at which retarding/advancing motion is first detected may be stored in the controller memory at 1312, and the nominal maximum detent duty cycle value may be retrieved from memory at 1314.

A new border between the detent region and the transitional region and a new border between the transitional region and the retard region may be learned based on the phaser movement detected at 1310. It will be appreciated that in an alternate example, the transitional region may be between the detent region and the advance region. The current borders between the detent and transitional regions and between the transitional and retard regions may be updated based on these new borders. In one example, the current borders may be updated as a function of a difference between the learned new borders and respective current borders, the function including one or more of an adder and a multiplier. In particular, an offset may be determined at 1316 based on the difference between the duty cycle value at which retarding motion was first detected and the nominal maximum detent duty cycle value. The retrieved nominal duty cycle value may be trimmed at 1318 based on the determined offset trim to provide an upper bound on duty cycle values that may be commanded to engage the detent circuit. This upper bound may be considered an updated border between the detent region and transitional region, and may correspond to the minimum phasing rate command within the detent region. If phaser motion at 1310 occurred earlier than expected, that is to say at a lower duty cycle value than expected based on the current border, the updated border may be at a lower value than the current border. If phaser motion at 1310 occurred later than expected, that is to say at a higher duty cycle value than expected based on the current border, the updated border may be at a higher value than the current border.

At 1320, the stored duty cycle value at which retarding motion was first detected may be applied as a lower clip to the duty cycle values that may be commanded during closed loop phaser control. This lower clip may be considered an updated border between the transitional region and the retard region, and may correspond to the maximum phasing rate command within the retard region. If phaser motion at 1310 occurred earlier than expected, that is to say at a lower duty cycle value than expected based on the current border, the updated border may be at a lower value than the current border. If phaser motion at 1310 occurred later than expected, that is to say at a higher duty cycle value than expected based on the current border, the updated border may be at a higher value than the current border. The look-up table, which among other information may include duty cycle values for different retardation speeds, may be updated with the learned upper and lower bounds at 1322, at which point the learning mode is completed and method 1300 terminates. The updated mapping may then be applied during subsequent phaser commands, for instance during commands moving the phaser from the locked position into a retarded position, from an advanced position into a retarded position, or other movements involving operation of the spool valve in the detent or retard regions.

Figure 14:
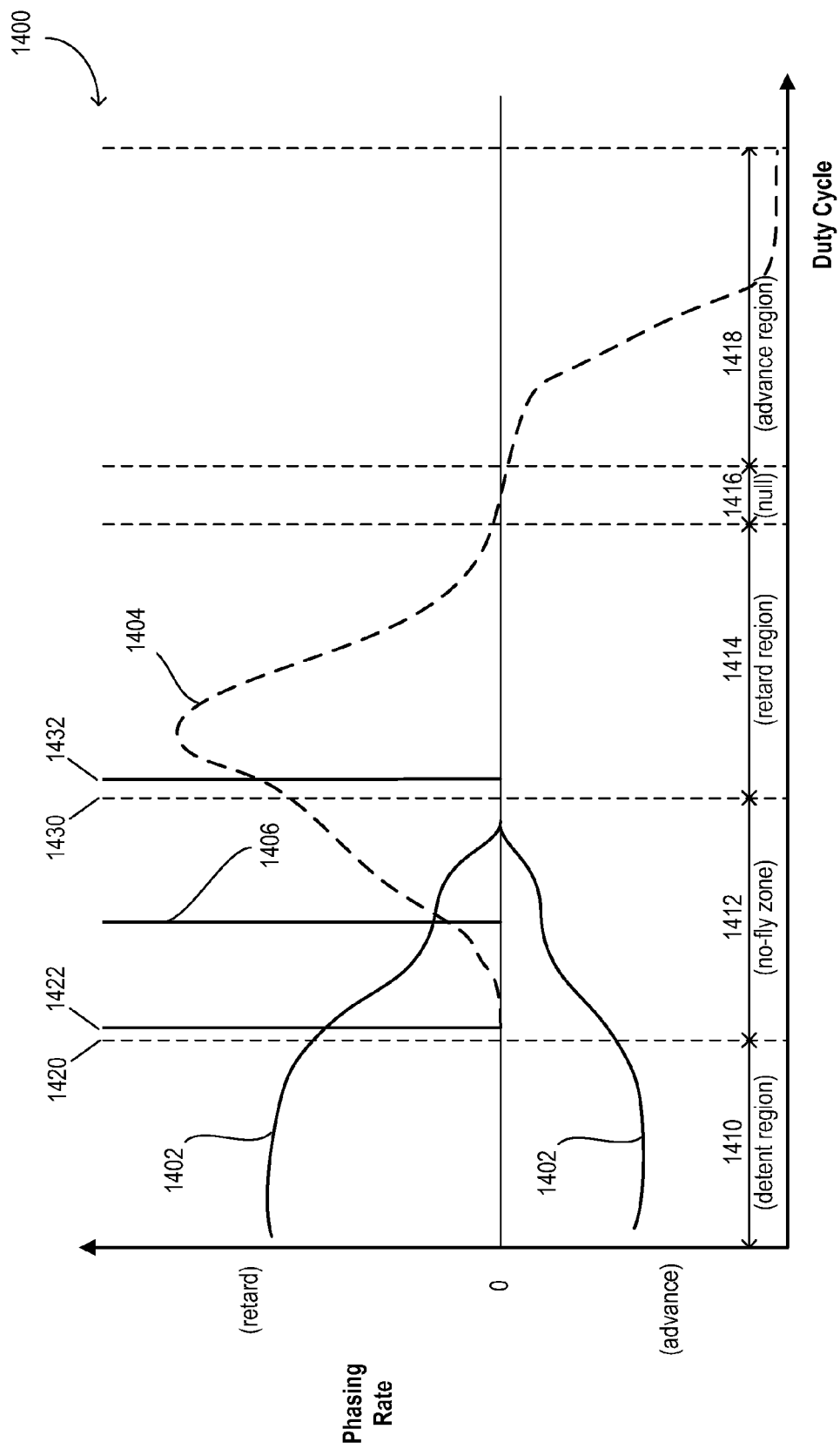
FIG. 14 depicts an example mapping of, and adaptive learning of the boundaries of, the spool valve's no fly zone.

FIG. 14 provides a visual example of the regions of duty cycle operation. Plot 1400 describes phasing rate, the rate of change of cam phaser position over time, as a function of solenoid duty cycle value. Curve 1402 describes phasing activity attributable to hydraulic activity in the detent circuit, while curve 1404 describes phasing activity attributable to hydraulic activity in the phasing circuit. Hydraulic activity in the detent circuit may induce phasing in either the advanced or retarded direction depending on the initial position of the cam phaser. For instance, if the detent circuit is activated when the cam phaser is in an advanced position, the detent circuit may induce a retarded phasing rate to steer the cam phaser toward the locking position. In another instance, if the detent circuit is activated when the cam phaser is in a retarded position, the detent circuit may induce an advanced phasing rate to steer the cam phaser toward the locking position. It will be appreciated that the duty cycle values may be divided into five regions 1410, 1412, 1414, 1416, 1418, which may be considered the detent region, no fly zone or transitional region, retard region, null region, and advance region, respectively. It will be appreciated that in an alternate example, the advance region may be adjacent to the transitional and null regions, where the retard region is presently depicted, and the retard region may be adjacent to only the null region, where the advance region is presently depicted.

As discussed earlier, the detent region 1410 may be considered the region of duty cycle values for which only hydraulic activity in the detent circuit is present. The no fly zone 1412 may be considered the region of duty cycle values for which hydraulic activity in both the detent and phasing circuits is present. The retard region 1414 may be considered the region of duty cycle values for which the cam phaser may be actuated in the retarded direction upon retarded torsion pulses. The null region 1416 may be considered the region of duty cycle values for which both the retard and advance lines in the phasing circuit are blocked, preventing actuation via torsion pulses. The advance region 1418 may be considered the region of duty cycle values for which the cam phaser may be actuated in the advanced direction upon advanced torsion pulses It will be appreciated that within the detent region, the magnitude of the phasing rate may decrease with increasing duty cycle values. It may be further noted that within the retard region, the magnitude of the phasing rate may increase with decreasing duty cycle values. The nominal max detent duty cycle value may be considered to be duty cycle value 1420, the current border between the detent and transitional regions. The first detection of retarded phasing of the cam phaser as described at 1310 may be at duty cycle 1406. In the present embodiment of plot 1400, the detection of retarded motion at 1406 may be considered later than expected, based on the current borders 1420, 1430 of the transitional region. Accordingly, both borders may be updated to higher values 1422, 1432. In another embodiment of plot 1400, the detection of retarded motion at 1406 may be considered earlier than expected, based on the current borders 1420, 1430 of the transitional region. Accordingly, the updated borders 1422, 1432 may be lower than the current borders. In this way, the minimum detent command applied to the spool valve, that is to say the duty cycle value associated with the minimum phasing rate via the detent circuit, may be limited based on the updated border 1422 between the detent and transitional regions. Further, the maximum retard command applied to the spool valve, that is to say the duty cycle value associated with the maximum retarded phasing rate, may be limited based on the updated border 1432 between the transitional and retard regions. The updated borders may be applied during subsequent phasing commands. For instance, if the updated border between the transitional region and the retard region is lower than the previous border, subsequent commands for the retarded phasing speeds may be associated with lower duty cycle values. In another instance, if the updated border between the transitional region and the retard region is higher than the previous border, subsequent commands for the retarded phasing speeds may be associated with higher duty cycle values.

Method 1400 may be implemented using an engine system, comprising an engine cylinder including valves, cams coupled to a camshaft for actuating the valves, a variable cam timing phaser for adjusting valve timing, the phaser actuated using torque from the cams, a solenoid driven spool valve for adjusting a position of the phaser, and a controller with computer readable instructions stored on non-transitory memory for receiving a command for moving the phaser out of a locked position to a desired unlocked position, and estimating an error between an actual unlocked position of the phaser relative to the desired unlocked position. In response to the error being higher than a threshold, the controller may operate in a learning mode with the phaser commanded to the locked position to update a map of a transitional region between a detent region and a retard region of a spool valve based on motion out of the locked position relative to spool valve motion through the transitional region. In another example, when the detent region is adjacent to the advance region, the transitional region may be between the detent region and the advance region of the spool valve. The commands received for moving the phaser out of a locked position to a desired unlocked position may be commands within the detent or retard regions of the spool valve stroke. The engine controller may include further instructions for, after updating the map, adjusting a command applied to move the phaser out of the locked position to the desired position. In one example, the command to the same unlocked position is updated. In this way, duty cycle commands that engage both the detent circuit and hydraulic circuit may be avoided.

FIG. 15 provides a method 1500 for indicating degradation of the cam phaser based on cam torque oscillations being higher than a threshold, the cam torque oscillations learned while the spool valve is outside the no fly zone. In response to this indication, the spool valve may be moved to the detent region to move the phaser to the locking position and hold the phaser in the locking position with the locking pin engaged. Cam torque oscillations may be higher than the threshold due to simultaneous hydraulic activity in both the detent and phasing circuits. The simultaneous activity may arise due to inadvertent spool valve commands within the no fly zone, or due to hardware failure in the detent circuit such as oil leakage. For example, oil leakage may occur because of a degraded check valve, degraded spool valve, or degraded detent valve, in addition to a degraded rotor clearance. Degradation of a spool valve, check valve, or detent valve may include degradation of a seal on one or more of these valves. The method is based on the measurement of the magnitudes of cam torsion pulses, which are greater when both the detent circuit and the closed loop phasing circuits are engaged than when only the closed loop phasing circuit is engaged.

At 1502, engine conditions are estimated, and it is determined if the desired and actual cam phaser positions are steady along with a steady engine speed. As such, adaptive learning of cam torsion patterns may be enabled only when the cam phaser and engine speed conditions are steady. In one example, the engine speed may be determined to be steady if the change in engine speed is less than a threshold. Likewise, the cam phaser position may be determined to be steady of the change in cam phaser position is less than a threshold.

Upon confirming steady-state conditions, it may be confirmed that the solenoid duty cycle is not currently in the no fly zone. After ensuring that the solenoid duty cycle is not commanding the spool valve within the no fly zone at 1504, the controller may measure the magnitudes or intensities of cam torsion pulses at 1508. If the spool valve is not within the no fly zone, it may be in one of the retard, null, or advance regions. The average torsion for each tooth on the cam wheel over a number of camshaft revolutions may be estimated, and a metric may be computed for peak-to-peak amplitude of the cam torsion frequency amplitude of the torsion on each tooth. The frequency of the torsions is proportional to the engine speed. The amplitude of the torsions is a function of engine speed, with the amplitude decreasing as engine speed increases. This data may be compared at 1508 to the nominal torsion on each tooth as a function of engine speed, which is retrieved from a lookup table. The nominal torsion values may be updated as a function of a difference between the learned new borders and respective current borders, the function including one or more of an adder and a multiplier. In the present example, updating may involve determining an offset trim at 1510 based on the difference between the measured torsion and the nominal torsion terms. At 1512, this offset may be applied to the nominal term and stored as a base magnitude term for a particular engine speed. The base magnitude term may be considered an updated nominal term, and may used as the basis of a threshold torsion magnitude later. This marks the end of the adaptive learning or mapping section of routine 1500.

At 1514, the ongoing instantaneous peak-to-peak cam torsion may be measured. These measurements may occur during any engine operating conditions, including when the spool valve is operating in the no-fly zone. The amplitude of these cam torsion pulses may be compared to the base magnitude term multiplied by a tolerance factor at 1516. In one example, an average cam torsion peak-to-peak amplitude as a function of cam position and engine speed may be estimated from the ongoing instantaneous peak-to-peak cam torsion measurements. If the instantaneous peak to peak torsion measure is greater than the base magnitude multiplied by the tolerance factor, degradation of the detent circuit hardware or inadvertent command of the solenoid duty cycle within the no fly zone may be indicated at 1518. Else, at 1524, no degradation may be indicated. A distinction may be made between inadvertent operation in the no-fly zone and degradation of detent circuit hardware based on the individual tooth signatures of the cam oscillation. In another example, degradation of circuit hardware may be indicated if operating with a duty cycle substantially higher than the upper duty cycle of the mapped no-fly zone or operating with a duty cycle substantially lower than the lower duty cycle of the mapped no-fly zone, and inadvertent command of the duty cycle within the no fly zone may be indicated otherwise. Degradation of the detent circuit hardware may result in an inadvertent engagement of the detent circuit during closed loop phaser control. For instance, if the degradation resulted in loss of oil pressure within the detent circuit, the pilot valve may supply oil to the detent oil circuit at the same time the spool valve is supplying oil to the closed loop phasing circuit.

At 1520, in response to the indication of degradation, the cam phaser may be commanded to the locking position with the locking pin engaged in order to prevent competition between the detent circuit and the phasing circuit. This command discontinues closed loop cam position control. In addition, based on the indication of degradation, a flag may be set at 1518 to indicate that closed loop control is not appropriate or is disabled at the current engine conditions.

In one example, an engine system may comprise an engine cylinder including valves, cams coupled to a camshaft for actuating the valves, a cam position sensor coupled to each cam, an engine speed sensor, a variable cam timing phaser for adjusting valve timing, the phaser actuated using torque from the cams, a solenoid driven spool valve for adjusting a position of the phaser, and a controller with computer readable instructions stored on non-transitory memory for mapping cam torsion oscillations as a function of engine speed and cam position while engine speed is steady, and while the spool valve is commanded to one of a retard and advance region, and in response to instantaneous cam torsion oscillations at a given engine speed being higher than a threshold, the threshold based on the mapping, indicating degradation of the phaser. In this system, indicating degradation of the phaser may include indicating degradation of a component of a detent circuit of the phaser. Further, the threshold based on the mapping may include the threshold based on an average amplitude of the mapped cam torsion oscillations at the given engine speed and a multiplier. The engine controller may include further instructions for, in response to the indication, discontinuing closed loop cam position control while maintaining open loop cam position control. In this way, inadvertent engagement of both the detent and phasing circuits by way of hardware failure or inadvertent duty cycle control in the no fly zone may be averted by disabling the engagement of the phasing circuit.

In this way, the reliability and accuracy of operating a cam torque actuated variable cam timing phaser can be increased, thereby improving engine performance. The technical effect of actively commanding a phaser spool valve to a detent region responsive to low hydraulic fluid (e.g., oil) pressure is that VCT position controls may not be allowed to conflict with inadvertent engagement of the detent oil circuit due to the low oil pressure. Instead, during conditions of low system oil pressure, hydraulic fluid flow is only enabled through the detent circuit, rather than the phasing circuit, until sufficient system oil pressure returns. As such, this averts the presence of competing oil flow through the phasing circuit lines. The technical effect of moving the spool valve based on a timing of retarded cam torsion events is that unwanted position adjustments away from a desired position generated by camshaft retard torsions can be reduced. As such, this improves the consistency of VCT phaser adjustments. Alternatively, by prepositioning a cam phaser at a position advanced of a mid-lock position, even if retarded cam torsions do occur during the movement of the spool valve through the retard region, the retarded cam torsions may be advantageously used to move the cam phaser closer towards the desired position at which the locking pin is to be engaged. By reducing the occurrence of unwanted position adjustments arising from movement of a spool valve travel through a retard region, the time associated with engaging a locking pin of a VCT phaser may be made more consistent. Further, by disengaging the locking pin of the cam phaser selectively only when the duty cycle is commanding minimal amounts of phase adjustment, disengagement of the locking pin before normal phasing is resumed may be better ensured. As such, this reduces side-loading of the phaser due to drastic phase adjustments. By also opportunistically mapping regions as well as boundaries between regions of the spool valve, spool valve duty cycle commands may be made more accurate. As such, this reduces errors in phaser position control. In addition, phaser response to spool valve commands may be rendered more consistent. Overall, by reducing unintended and undesired cam phaser positioning errors, the performance of a VCT system can be improved.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
    moving cam timing of a cam timing phaser via cam torque actuated hydraulic pressure separate from engine generated system oil pressure via a spool valve; and
    in response to the system oil pressure falling below a threshold while moving the cam timing, adjusting a position of the spool valve to a detent region of the spool valve to reduce the system oil pressure applied to a locking circuit of the phaser.

2. The method of claim 1, wherein moving the cam timing via the spool valve includes moving the spool valve to an advance region of the spool valve to use the cam torque actuated hydraulic pressure to advance a position of the cam timing phaser, moving the spool valve to a retard region of the spool valve to use the cam torque actuated hydraulic pressure to retard the position of the cam timing phaser, and moving the spool valve to a null region to use the cam torque actuated hydraulic pressure to hold the position of the cam timing phaser.

3. The method of claim 2, wherein using the cam torque actuated hydraulic pressure to advance the cam timing phaser position includes flowing hydraulic fluid from a retard chamber of the phaser to an advance chamber through a phasing circuit using the cam torque actuated hydraulic pressure, wherein using the cam torque actuated hydraulic pressure to retard the cam timing phaser position includes flowing hydraulic fluid from the advance chamber to the retard chamber through the phasing circuit using the cam torque actuated hydraulic pressure, and wherein using the cam torque actuated hydraulic pressure to hold the cam timing phaser position includes disabling flow of the hydraulic fluid through the phasing circuit between the retard and advance chambers.

4. The method of claim 3, wherein moving the cam timing via the spool valve further includes maintaining the system oil pressure applied to the locking circuit of the phaser to hold a locking pin disengaged.

5. The method of claim 4, wherein adjusting the position of the spool valve to reduce the system oil pressure applied to the locking circuit includes enabling engagement of the locking pin.

6. The method of claim 5, wherein adjusting the position of the spool valve to reduce the system oil pressure further includes disabling flow of the hydraulic fluid through the phasing circuit.

7. The method of claim 5, further comprising, raising an engine idle speed to raise the system oil pressure above the threshold.

8. The method of claim 7, wherein the engine idle speed is raised after a threshold duration has elapsed since the engagement of the locking pin with no rise in system oil pressure.

9. The method of claim 5, further comprising, in response to the system oil pressure rising above the threshold, moving the spool valve out of the detent region.

10. The method of claim 9, wherein moving the spool valve out of the detent region includes increasing the cam torque actuated hydraulic pressure on the locking circuit of the phaser to disengage the locking pin.

11. The method of claim 2, wherein using the cam torque actuated hydraulic pressure to advance the cam timing phaser position includes using advanced cam torsions and wherein using the cam torque actuated hydraulic pressure to retard the cam timing phaser position includes using retarded cam torsions.

12. The method of claim 1, wherein adjusting in response to the system oil pressure falling below the threshold includes adjusting while the cam torque actuated hydraulic pressure is able to move the cam timing of the cam timing phaser via the spool valve.

13. A method, comprising:
while cam torque generated hydraulic pressure in a phasing circuit of a cam torque actuated cam timing phaser is higher than a first threshold,
moving cam timing; and
in response to engine speed generated hydraulic pressure applied on a locking circuit of the phaser being lower than a second threshold, distinct from the first threshold, while moving the cam timing, moving a spool valve of the phaser to a detent region of the spool valve to move and hold the phaser at a locking position with a locking pin engaged.

14. The method of claim 13, wherein moving the spool valve to move the phaser includes moving the phaser to the locking position by flowing hydraulic fluid through a detent circuit of the phaser and not through the phasing circuit of the phaser.

15. The method of claim 13, further comprising, holding the phaser at the locking position with the locking Din engaged for a threshold duration, and in response to less than a threshold increase in engine speed generated hydraulic pressure during the threshold duration, increasing engine idle speed.

16. A method, comprising:
during a first condition, when system oil pressure in a locking circuit of a variable cam phaser falls below a threshold while moving cam timing of the phaser via cam torque generated oil pressure, holding the phaser in a mid-lock position with a locking pin engaged until the system oil pressure is raised above the threshold; and
during a second condition, when the system oil pressure is higher than the threshold while moving the cam timing, holding the phaser in the mid-lock position without engaging the locking pin by utilizing the cam torque generated oil pressure.

17. The method of claim 16, wherein the mid-lock position corresponds to a position between an advance region and a retard region of a spool valve coupled to the cam phaser.

18. The method of claim 17, wherein the variable cam phaser is a cam torque actuated phaser and wherein during the second condition, a camshaft torque pulse is used to move the spool valve to the mid-lock position, and wherein during the first condition, the camshaft torque pulse remains unused.

19. The method of claim 17, wherein during the first condition, the spool valve is moved to a detent region, and wherein during the second condition, the spool valve is moved to one of the advance region and the retard region.

* * * * *

UNITED STATES PATENT AND TRADEMARK OFFICE
CERTIFICATE OF CORRECTION

PATENT NO. : 9,988,949 B2
APPLICATION NO. : 14/520174
DATED : June 5, 2018
INVENTOR(S) : Pietrzyk et al.

Page 1 of 1

It is certified that error appears in the above-identified patent and that said Letters Patent is hereby corrected as shown below:

In the Claims

Column 42, Line 22, Claim 15, "Din" should read "pin".

Signed and Sealed this
Eleventh Day of September, 2018

Andrei Iancu
*Director of the United States Patent and Trademark Office*